(12) United States Patent
Al-Mufti et al.

(10) Patent No.: US 12,267,689 B2
(45) Date of Patent: Apr. 1, 2025

(54) SYSTEMS AND METHODS FOR PROVIDING A RADIO PROMPT ACCESS TO SHARED SPECTRUM

(71) Applicant: Outdoor Wireless Networks LLC, Claremont, NC (US)

(72) Inventors: Khalid W. Al-Mufti, Sterling, VA (US); Ariful Hannan, Sterling, VA (US)

(73) Assignee: Outdoor Wireless Networks LLC, Claremont, NC (US)

( * ) Notice: Subject to any disclaimer, the term of this patent is extended or adjusted under 35 U.S.C. 154(b) by 595 days.

(21) Appl. No.: 17/571,807

(22) Filed: Jan. 10, 2022

(65) Prior Publication Data

US 2022/0225109 A1     Jul. 14, 2022

Related U.S. Application Data

(60) Provisional application No. 63/135,983, filed on Jan. 11, 2021.

(51) Int. Cl.
| | |
|---|---|
| *H04W 16/14* | (2009.01) |
| *H04W 52/24* | (2009.01) |
| *H04W 52/28* | (2009.01) |
| *H04W 52/36* | (2009.01) |

(52) U.S. Cl.
CPC ......... *H04W 16/14* (2013.01); *H04W 52/243* (2013.01); *H04W 52/283* (2013.01); *H04W 52/367* (2013.01)

(58) Field of Classification Search
None
See application file for complete search history.

(56) References Cited

U.S. PATENT DOCUMENTS

| | | | |
|---|---|---|---|
| 8,040,844 B2 | 10/2011 | Olexa et al. | |
| 10,681,560 B1 | 6/2020 | Sevindik et al. | |
| 10,999,844 B2 | 5/2021 | Sevindik et al. | |
| 11,451,969 B2 | 9/2022 | Furuichi et al. | |
| 11,617,087 B2 | 3/2023 | Cimpu et al. | |
| 11,997,614 B2* | 5/2024 | Al-Mufti | H04W 72/541 |
| 12,120,615 B2* | 10/2024 | Al-Mufti | H04W 72/541 |
| 2006/0263252 A1 | 11/2006 | Sanchez-Olea et al. | |
| 2008/0112360 A1 | 5/2008 | Seidel et al. | |
| 2009/0088083 A1 | 4/2009 | Fujii et al. | |
| 2010/0330919 A1 | 12/2010 | Gurney et al. | |

(Continued)

OTHER PUBLICATIONS

U.S. Patent and Trademark Office, "Notice of Allowance", U.S. Appl. No. 17/703,640, dated Feb. 5, 2024, pp. 1 through 13, Published: US.

(Continued)

*Primary Examiner* — Christopher T Wyllie
(74) *Attorney, Agent, or Firm* — Fogg & Powers LLC

(57) ABSTRACT

Techniques are provided for temporarily allocating a new radio controlled by a spectrum access system (SAS) a frequency spectrum in shared spectrum in which to transmit, and a maximum transmit power level. The temporary frequency spectrum and optionally maximum transmit power level may be sent to the new radio so that it can commence transmitting prior to a planned, e.g., periodic, spectrum coordination is performed for all radios which had requested authorization from the SAS to transmit in the shared spectrum.

33 Claims, 8 Drawing Sheets

(56) References Cited

U.S. PATENT DOCUMENTS

| | | |
|---|---|---|
| 2015/0092700 A1 | 4/2015 | Li et al. |
| 2015/0119059 A1 | 4/2015 | Miao et al. |
| 2015/0264135 A1 | 9/2015 | Kandula et al. |
| 2016/0004787 A1 | 1/2016 | Shinkuma et al. |
| 2016/0088485 A1 | 3/2016 | Guo et al. |
| 2016/0182139 A1 | 6/2016 | Yi et al. |
| 2017/0208474 A1 | 7/2017 | Mody et al. |
| 2017/0318470 A1 | 11/2017 | Srikanteswara et al. |
| 2017/0374558 A1 | 12/2017 | Zhao et al. |
| 2018/0139616 A1 | 5/2018 | Khoshnevisan et al. |
| 2018/0376341 A1* | 12/2018 | Khoshnevisan ...... H04W 16/12 |
| 2019/0007909 A1 | 1/2019 | Mueck et al. |
| 2019/0069187 A1* | 2/2019 | Ashrafi ............... H04L 41/5054 |
| 2019/0120969 A1* | 4/2019 | Hamzeh ................. G01S 19/21 |
| 2019/0141713 A1* | 5/2019 | Cimpu ................ H04W 72/541 |
| 2019/0150005 A1* | 5/2019 | Cendrillon .......... H04L 41/0823 370/252 |
| 2019/0174359 A1 | 6/2019 | Hannan |
| 2019/0223037 A1 | 7/2019 | Raghothaman |
| 2019/0327765 A1 | 10/2019 | Mukherjee et al. |
| 2019/0373615 A1* | 12/2019 | Cimpu ................ H04W 72/541 |
| 2019/0394678 A1* | 12/2019 | Syed .................... H04B 17/318 |
| 2020/0037175 A1* | 1/2020 | Sevindik ............... H04W 92/20 |
| 2020/0053669 A1 | 2/2020 | Hannan et al. |
| 2020/0162929 A1* | 5/2020 | Cimpu ................ H04J 11/0026 |
| 2020/0178089 A1* | 6/2020 | Sevindik ............... H04W 16/32 |
| 2020/0187133 A1 | 6/2020 | Syed et al. |
| 2020/0351899 A1 | 11/2020 | Sun et al. |
| 2021/0017688 A1* | 1/2021 | Lee .......................... D06F 34/32 |
| 2021/0044984 A1 | 2/2021 | Sun et al. |
| 2021/0076223 A1 | 3/2021 | Taneja et al. |
| 2021/0144724 A1 | 5/2021 | Macmullan et al. |
| 2021/0160743 A1 | 5/2021 | Pazhyannur et al. |
| 2021/0211880 A1 | 7/2021 | Khawer et al. |
| 2021/0337391 A1 | 10/2021 | Sevindik et al. |
| 2021/0345121 A1 | 11/2021 | Cimpu |
| 2021/0345352 A1 | 11/2021 | Zhao et al. |
| 2021/0389474 A1* | 12/2021 | Hamzeh ............... H04B 7/1853 |
| 2021/0400498 A1 | 12/2021 | Ioffe et al. |
| 2022/0095264 A1 | 3/2022 | Cook |
| 2022/0224408 A1 | 7/2022 | Al-Mufti et al. |
| 2022/0225109 A1* | 7/2022 | Al-Mufti ............. H04W 52/243 |
| 2022/0345895 A1* | 10/2022 | Al-Mufti ............. H04W 40/246 |
| 2022/0346029 A1* | 10/2022 | Al-Mufti ............. H04W 40/246 |
| 2022/0346030 A1* | 10/2022 | Al-Mufti ............. H04W 52/243 |
| 2022/0400487 A1* | 12/2022 | Sevindik ............... H04W 16/14 |
| 2023/0007668 A1 | 1/2023 | Al-Mufti et al. |
| 2023/0012713 A1 | 1/2023 | Khalid et al. |
| 2023/0071539 A1 | 3/2023 | Dijkstra et al. |
| 2023/0093833 A1 | 3/2023 | Hafeez et al. |

OTHER PUBLICATIONS

Wireless Innovation Forum, "WINNF-SSC-0010, Signaling Protocol and Procedures for Citizens Broadband Radio Service (CBRS): Winnforum Recognized CBRS Grouping Information" V4.2.0, Jun. 30, 21, pp. Title page through 8.

Wireless Innovation Forum, "WINNF-TS-0061, Test and Certification for Citizens Broadband Radio Service (CBRS); Conformance and Performance Test Technical Specifictation; SAS as Unit Unter Test (UUT)", V1.5.1, Oct. 7, 2019, pp. Title Page through 180.

Wireless Innovation Forum, WINNF-TS-0112, Requirements for Commercial Opeation in the U.S. 3550-3700 MHZ Citizens Broadband Radio Service Band, V1.9.1, Mar. 11, 2020, pp. Title page through 94.

Wireless Innovation Forum, "WINNF-TS-0112, Requirements for Commercial Operation in the U.S. 3550-3700 MJZz Citizens Broadband Radio Service Band" V1.4.1, Jan. 16, 2018, pp. Title Page through 69.

U.S. Patent and Trademark Office, "Office Action", U.S. Appl. No. 17/703,640, filed Oct. 6, 2023, pp. 1 through 11, Published: US.

U.S. Patent and Trademark Office, "Office Action", U.S. Appl. No. 17/572,410, dated Mar. 5, 2024, pp. 1 through 20, Published: US.

U.S. Patent and Trademark Office, "Notice of Allowance", U.S. Appl. No. 17/703,632, dated Jun. 11, 2024, pp. 1 through 31, Published: US.

U.S. Patent and Trademark Office, "Notice of Allowance", U.S. Appl. No. 17/720,056, filed Jan. 11, 2024, pp. 1 through 16, Published: US.

U.S. Patent and Trademark Office, "Notice of Allowance", U.S. Appl. No. 17/703,608, dated Nov. 20, 2024, pp. 1-48, Published: U.S.

* cited by examiner

SYSTEMS AND METHODS FOR PROVIDING A RADIO PROMPT ACCESS TO SHARED SPECTRUM

CROSS-REFERENCE TO RELATED APPLICATIONS

The present application claims benefit of U.S. Patent Application Ser. No. 63/135,983, filed Jan. 11, 2021; the entire contents of the aforementioned patent application are incorporated herein by reference as if set forth in its entirety.

BACKGROUND

A citizens broadband radio service (CBRS) includes incumbent users of shared spectrum and secondary users of shared spectrum. An incumbent user may also be referred to as a primary user. Incumbent users have priority access to transmit in the spectrum shared with the secondary users. If a secondary user seeks permission to transmit on spectrum shared by incumbent user(s) and/or other secondary user(s), it will only be permitted to do so to the extent its transmissions do not raise aggregate interference at the incumbent user(s) and/or other secondary user(s) above corresponding interference threshold levels for each of such incumbent user(s) and secondary user(s).

Such secondary users use citizens broadband radio service device(s) (CBSD(s)). A CBSD is a radio including a transmitter coupled to an antenna. A CBRS system includes a spectrum access system (SAS) which regulates the transmissions of CBSD(s) in shared spectrum under the SAS's control, e.g., whether each CBSD of a SAS can transmit in the shared spectrum, and if so, then at what power level, to ensure that aggregate interference at incumbent users and other CBSDs is within appropriate limits. The SAS also may include a function to coordinate the shared spectrum usage among secondary users that are General Authorized Access (GAA) CBSDs to diminish interference between GAA CBSDs and to regulate interference from GAA CBSD(s) at certain location(s), e.g., geographic location(s) of incumbent user(s), of protection area(s), and of exclusion zone(s).

A requesting secondary user is a user requesting to transmit in shared spectrum controlled by a SAS and shared with higher priority user(s) and/or other secondary user(s) whose transmission(s) are controlled by the SAS. The SAS must authorize the requesting secondary user to transmit in the spectrum shared with higher priority user(s) and/or the other secondary user(s) controlled by the SAS.

Typically, a SAS evaluates the requests from requesting secondary users at planned times, e.g., once a day at a certain time, when it determines whether secondary user(s) who have requested to transmit in the shared spectrum can do so and at what maximum transmit power level. Thus, requesting secondary user(s) must wait until the next planned time to receive authorization to transmit in the shared spectrum. For example, if a SAS evaluates such requests once a day, a secondary user may have to wait up to twenty-four hours before receiving authorization to transmit.

SUMMARY OF THE INVENTION

A computer program product is provided. The program product comprises a non-transitory processor readable medium on which program instructions are embodied, wherein the program instructions are configured, when executed by at least one programmable processor, to cause the at least one programmable processor to: receive co-existence data and information about a new radio configured to transmit in shared frequency spectra, wherein the co-existence data includes data about a network graph comprising at least one connected set, wherein each connected set comprises at least one node and each node comprises at least one other radio; and determine a frequency spectrum and a maximum transmit power that can be allocated to the new radio prior to execution of planned spectrum coordination analysis and based upon whether the new radio forms an edge with at least one node of at least one connected set, wherein an edge occurs when a criterion of interference at either the new radio due to at least one radio of which the at least one node comprises, or the at least one node due to the new radio, exceeds a corresponding threshold level.

DRAWINGS

Comprehension of embodiments of the invention is facilitated by reading the following detailed description in conjunction with the annexed drawings, in which.

Figure 4:
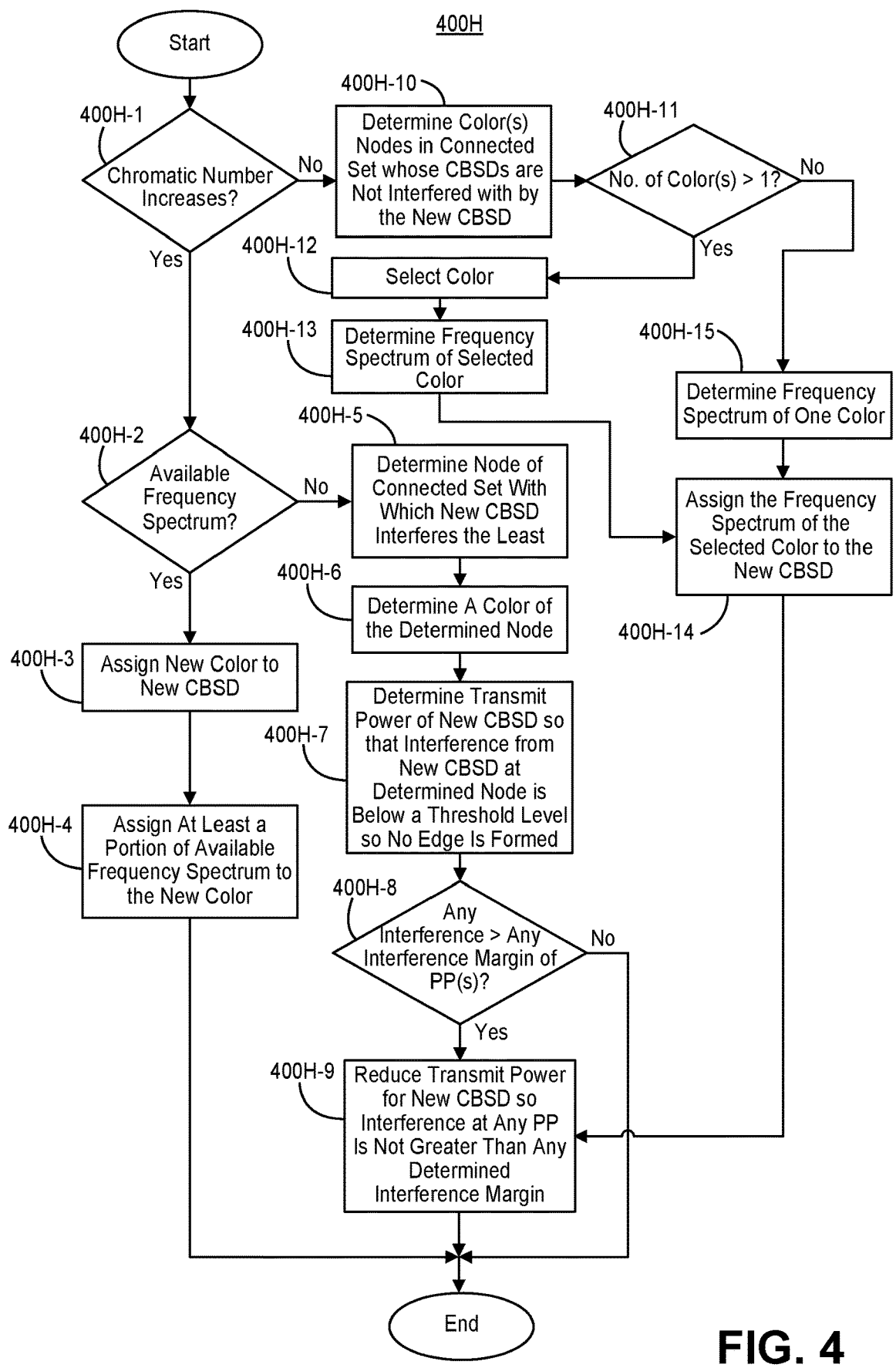
Figure 5:
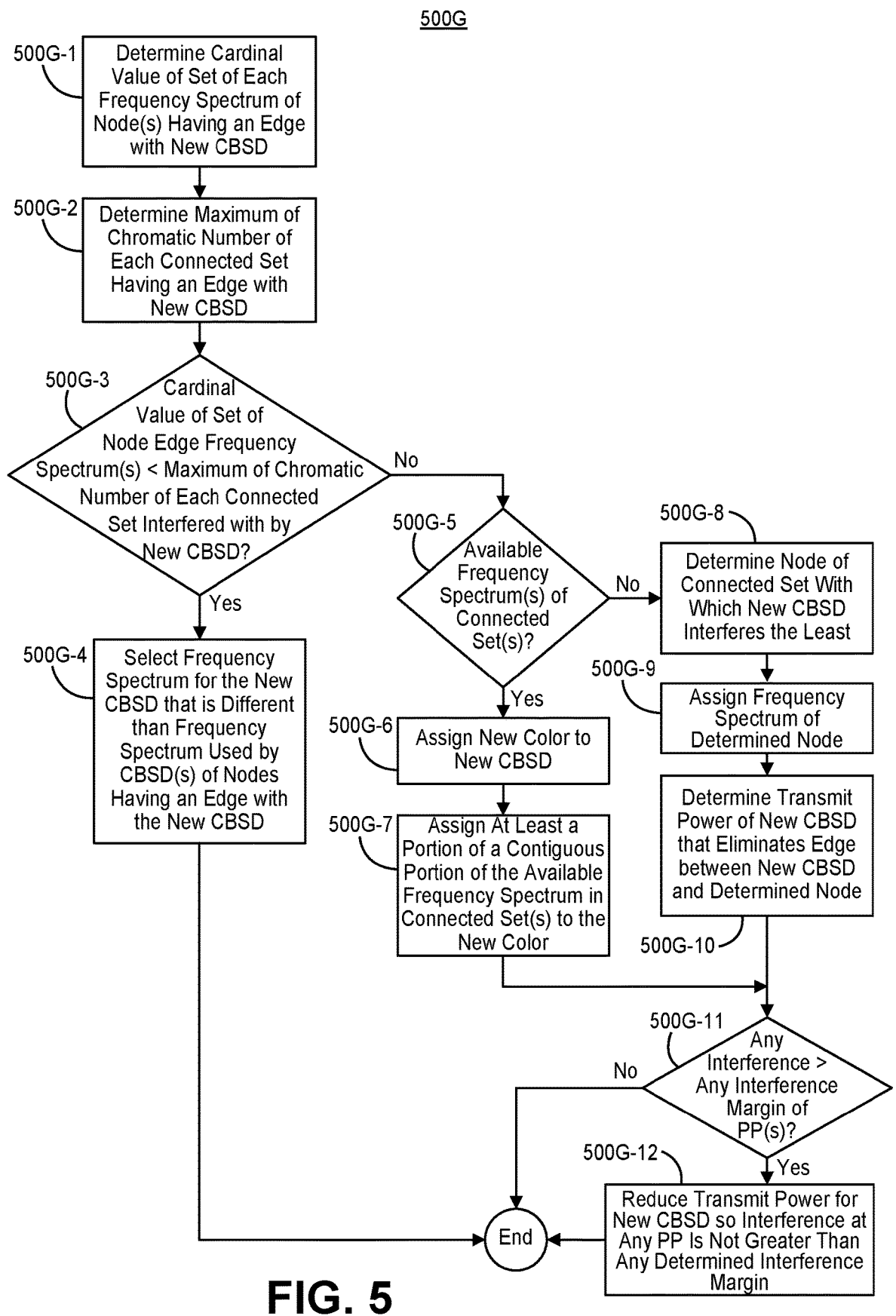

FIG. 4 illustrates a flow diagram of one embodiment of a method of determining a frequency spectrum and a maximum transmit power which can be granted to the new citizens broadband radio service device when there is an edge with only one connected set; and FIG. 5 illustrates a flow diagram of one embodiment of a method of determining a frequency spectrum and a maximum transmit power which can be granted to the new citizens broadband radio service device when there is an edge with more than one connected set.

DETAILED DESCRIPTION

Embodiments of an invention provide techniques for a SAS to provide authorization more promptly to a new CBSD to utilize, e.g., transmit in, the shared spectrum. The new CBSD may be a GAA or a PAL CBSD. Upon sending a grant request to utilized shared spectrum, the new CBSD may receive a temporary grant response, e.g., which may have been predetermined based upon the new CBSD information and co-existence data previously determined at the last planned time.

Thus, the new CBSD does not need to wait until after the next planned time to receive a response authorizing the new CBSD to transmit in the shared spectrum. Thus, the new CBSD can more promptly transmit in the shared spectrum. Hence, the shared spectrum can be more efficiently used because more data can be communicated in the shared spectrum. Shared spectrum (or shared frequency spectrum) means frequency spectra utilized by at least two of incumbent user(s), grandfather wireless protection zone(s), environmental sensing capability system receiver(s), fixed satellite service (FSS), PAL CBSD(s), and GAA CBSD(s).

The new CBSD may be allocated a frequency spectrum and a maximum transmit power based upon a minimum interference margin. The minimum interference margin means a minimum of an interference margin and corresponds to a unique protection point which has the minimum interference margin. The interference margin is determined for a frequency spectrum, or each portion thereof, associated with each protection point having a neighborhood encompassing a geographic location of the new CBSD. Frequency spectrum, or each portion thereof, associated with a protection point means frequency spectrum that must be free of interference (as that term is elsewhere defined herein) at the geographic location of the protection point; optionally, such frequency spectrum corresponds to frequency spectrum utilized by a receiver of an incumbent user or a PAL CBSD. The interference margin for a frequency spectrum or each portion thereof associated with a protection point means a sum of head room margin for the protection point and an unused interference margin of the frequency spectrum or each portion thereof associated with the protection point; optionally, the interference margin is determined by also summing (with the head room margin and the unused interference margin) an indirect reduction margin of the frequency spectrum or each portion thereof associated with the protection point. The head room margin at the protection point means an amount of reduction, e.g., 1 dB, of maximum aggregate interference at the protection point below the corresponding interference threshold level at the protection point. If more than one SAS controls CBSDs geographically located within a neighborhood of a protection point, then the head room margin is equally allocated to each SAS. The unused interference margin of the frequency spectrum or each portion thereof associated with the protection point means an interference threshold level of the frequency spectrum or each portion thereof associated with the protection point less than a sum of aggregate interference (in the same frequency spectrum or each portion thereof) from CBSD(s) geographically located in the neighborhood of the protection point, where the interference threshold level is greater than the sum of the aggregate interference. The unused interference margin excludes the indirect reduction margin because the unused interference margin is determined on a protection point by protection point basis and does not account an indirect effect of other protection point(s). If more than one SAS controls CBSDs geographically located within a neighborhood of a protection point, then the unused interference margin for the frequency spectrum or each portion thereof is equally allocated to each SAS. The indirect reduction margin at the protection point means unused interference margin of the frequency spectrum or each portion thereof associated with the protection point due to a reduction of transmit power of CBSD(s) (controlled by a SAS) geographically located in neighborhood(s) of other protection point(s). The indirect reduction margin can only be shared with CBSD(s) controlled by the SAS. The CBSD(s) are also geographically located in the neighborhood of the protection point. Optionally, the indirect reduction margin may be determined by a method, e.g., an iterative allocation process (IAP), that allocates interference margin to CBSD(s) in neighborhoods of two or more protection points; IAP is discussed elsewhere herein.

Optionally, embodiments of the head room margin, the unused interference margin, and the indirect reduction margin are described in WINNF-TS-0061-V1.1.0, Appendix B, which is incorporated herein by reference in its entirety.[1]

[1] An example is provided for a given frequency spectrum associated with a protection point. An interference threshold for the protection point is −80 dBm/MHz and a relative head room margin is 1 dB, then the SAS will allow aggregate interference, after distributing power fairly to CBSD(s) geographically located within a neighborhood of the protection point, e.g., using IAP, to be a maximum of −81 dBm/10 MHz, and therefore, an absolute head room margin is determined as:

$$10^{-80/10} - 10^{-\frac{81}{10}} = 2.1 \times 10^{-9} \text{ mW}/10 \text{ MHz},$$

or −86.86 dBm/10 MHz interference that can be added to existing aggregate interference at the protection point without exceeding the interference threshold of the protection point. This example applies to the case when only one SAS is managing the CBSD(s) geographically located within a neighborhood of the protection point. If more than one SAS manages the CBSD(s) geographically located within a neighborhood of the protection point, then the interference margin is uniformly distributed amongst each of the SASs. For the example provided, if there are 2 other peer SAS that manage the CBSD(s) geographically located within a neighborhood of the protection point, then the interference margin is determined as $$\frac{2.1 \times 10^{-9}}{3} = 6.9 \times 10^{-10} \text{ mW}/10 \text{ MHz}.$$

The aggregate interference power for the frequency spectrum at the protection point is −90 dBm/10 MHz, e.g., determined by IAP, contributed by all CBSD(s) geographically located within a neighborhood of the protection point. Thus, the unused interference margin for the frequency spectrum is $(10^{-81/10} - 10^{-90/10}) = 6.9 \times 10^{-9}$ mW/10 MHz. This example applies to the case when only one SAS is managing the CBSD(s) geographically located within a neighborhood of the protection point. If more than one SAS manages the CBSD(s) geographically located within a neighborhood of the protection point, then the unused interference margin is uniformly distributed amongst each of the SASs. Thus, the interference margin is $2.1 \times 10^{-9}$ mW/10 MHz+ $6.9 \times 10^{-9}$ mW/10 MHz = $9.0 \times 10^{-9}$ mW/10 MHz.

Optionally, the interference margin may include the indirect reduction margin, e.g., generated by IAP, of the frequency spectrum associated with the protection point. With respect to the example described above, an indirect reduction margin of for the protection point described above may be determined by subtracting a first interference power from a second interference power. The first interference power means an aggregate interference power level, at the frequency spectrum or portion at a protection point, using a lowest determined transmission power of each CBSD controlled by a SAS. A transmission power of each CBSD geographically located within a neighborhood of a protection point is determined, e.g., by IAP, by allocating interference margin to CBSD(s) geographically located within the neighborhood. When a CBSD is geographically located within neighborhoods of two or more protection points, then the lowest transmit power of the CBSD is determined. The second interference power means an aggregate interference power level, at the frequency spectrum or portion at a protection point, using a transmission power of each CBSD controlled by a SAS determined solely with respect to the protection point. Thus, for example, the first interference power level and the second interference power level are respectively −120 dBm/MHz and −95 dBm/10 MHz, thus, the indirect reduction margin is $$\left(10^{-95/10} - 10^{-\frac{120}{10}}\right) = 3.2 \times 10^{-10} \text{ mW}/10 \text{ MHz}.$$

Thus, the interference margin is $9.0 \times 10^{-9}$ mW/10 MHz+$3.2 \times 10^{-10}$ mW=$9.3 \times 10^{-9}$ mW/10 MHz.

Although embodiments of the invention are applicable to and may be exemplified in the context of CBRS for pedagogical purposes, the embodiments are applicable to other shared spectrum systems, such as for example licensed spectrum access systems or authorized access systems. Thus, for example, a CBSD may be more generally referred to as a radio. Embodiments of the invention comprise receiving information about a new CBSD configured to transmit in the shared spectrum and co-existence data.

Co-existence data includes information about protection points, including their corresponding geographic location, frequency spectrum, interference threshold level, and/or interference margin (e.g., for an incumbent user configured to receive in the shared spectrum), and a network graph comprising at least one node and including colors assigned to each node of the network graph and frequency spectrum assigned to each color, and wherein each node comprises at least one of the at least one other GAA CBSD; the co-existence data further includes data about each GAA CBSD (including geographic location, data indicative of maximum capable transmit power, and/or any parameters of the GAA CBSD's used to perform propagation modelling such as for example antenna radiation pattern and/or antenna height). The network graph comprises at least one connected set. Optionally, co-existence data only includes data about protection point(s) which have neighborhood(s) that encompass the geographic location of the new CBSD and/or co-existence data only includes connected set(s) (of nodes) of the network graph which have at least one node (having location(s) of any CBSD comprising the node) that are within a threshold distance of the new CBSD's geographic location; the threshold distance may be defined by the system designer or user. Optionally, co-existence data may include short-term new radio parameters for other new CBSD(s) which were granted frequency spectrum, using unplanned spectrum coordination analysis, after a last planned spectrum coordination analysis. Frequency spectrum means a bandwidth centered about a center frequency. Node means at least one GAA CBSD, where if the node comprises two or more GAA CBSD(s) each GAA CBSD utilizes the same frequency spectrum and is free of interference (as defined elsewhere herein) from each of the other GAA CBSD(s) comprising the node.

Unless otherwise indicated herein, power as used herein means power or power spectral density. Power levels for a shared spectrum system, such as a CBRS, are often characterized in terms of power spectral density levels.

A CBRS system comprises general authorized access (GAA) and/or priority access license (PAL) CBSDs, and higher priority users. The higher priority users, such as government users fixed satellite service receiver(s), have priority access to some or all of spectrum in the shared spectrum. A SAS grants the CBSDs access to the shared spectrum, including authorizing frequency spectrum (or channels) requested by CBSDs, and authorizing a corresponding requested maximum transmission power or assigning a lower maximum transmission power. The SAS controls the transmission of GAA CBSDs so that PAL CBSDs and the higher priority users are free of interference from GAA CBSDs. The GAA and PAL CBSDs are secondary users; the PAL CBSDs are secondary users because they have a lower priority than higher priority users (i.e., incumbent users) such as for example naval vessels. PAL and GAA CBSDs have to also protect Environmental Sensing Capability (ESC) sensors which are used to detect naval radar in the CBRS band. The SAS also controls the transmission of PAL CBSDs so that higher priority users are free of interference from PAL CBSDs.

Free of interference as used herein does not mean an absence of interference, but rather means an acceptable level of interference (i.e., a level of interference below a threshold level of interference) which may be no interference or a finite level of interference; thus, to determine if a geographic location, e.g. of an incumbent user or a secondary user is free of interference, whether the interference level is below the acceptable level of interference (or a threshold interference) is determined. The acceptable level of interference may vary by geography, frequency spectrum, incumbent type, license type, whether CBSD is licensed, and/or other indicia.

GAA CBSDs may be of two types: category A (low transmission power) and category B (high transmission power). Category A has a maximum transmission power spectral density of 30 dBm/10 MHz. Category B has a maximum transmission power spectral density of 47 dBm/10 MHz.

Higher priority users of shared spectrum have first, or highest, priority to utilize the shared spectrum controlled by the SAS. Thus, higher priority users (e.g., the receivers of higher priority users' communications systems or radios) shall be able to operate free of interference from other users, e.g., communications systems of priority access licensees and general authorized access users. Communications systems, as used herein, shall include Environmental Sensing Capability (ESC) receivers and satellite ground stations.

In one embodiment, PAL users have second (or intermediate) priority, after higher priority users (excluding PAL users), to utilize the frequency spectrum controlled by the SAS. In another embodiment, a PAL user shall be able to operate, when higher priority users (excluding PAL users) are free of interference of such a PAL user, and free of interference from other PAL users and general authorized access users. In one embodiment, an ability of a PAL user to operate free of interference shall be limited temporally, geographically, and spectrally within the specifications of its license.

GAA users have third, or lowest, priority to utilize the frequency spectrum controlled by the SAS. In one embodiment, an operation of GAA users will be governed by laws, regulations, and/or rules (e.g., pertaining to CBRS). Such laws, regulations, and/or rules may be established by government(s) and/or standards bodies (e.g., Wireless Innovation Forum or WInnForum). For example, such rules shall only let GAA users' CBSDs operate when they do not interfere with communication systems of higher priority users.

In one embodiment, the geographic coverage area proximate to (e.g., covered by radio frequency emissions of) the CBSD may include exclusion zones and protection point regions (including location(s) of fixed satellite service(s) (FSS(s)), priority access license (PAL) protection area(s) (PPA(s)), grandfathered wireless protection zone(s) (GWPZ(s)), dynamic protection area(s) (DPA(s)), and receiver(s) of environmental sensing capability (ESC) system(s) (or ESC system receiver(s)). CBSDs are prohibited from operating in specific frequency spectrum in exclusion zones. Further, the level of interference generated by CBSD(s) shall be limited in a protection point region so as not to interfere with certain communications systems, for example an ESC receiver or an FSS receiver. CBSDs may only operate with the permission of the SAS when an incumbent user's communication system is operating in a protection zone. In some cases, this operation will be based upon information received by an environmental sensing capability (ESC) system, from central database(s), notification from an incumbent user, and/or from a beacon indicating that secondary users should not use a certain portion of frequency spectrum. One type of protection point region is the grandfathered wireless protection zone which is a geographic area and/or frequency spectrum where grandfathered wireless broadband licensees can operate free of interference, e.g., of CBSDs. The foregoing are examples of exclusion zones and protection point regions; other type of exclusion and protection point regions may occur.

For a CBRS system, a higher priority user consists of a user consisting of at least one of: at least one incumbent user, at least one ESC system receiver, at least one FSS, at least one PAL radio, and at least one GWPZ. Optionally, the at least one incumbent user includes government entities operating systems such as communications systems, operators of fixed satellite communications systems, and grandfathered, prior licensees of the frequency spectrum.

The invention can be subsequently described in more general terms, e.g., using the term radio rather than CBSD, and shared spectrum system rather than CBRS. However, the terms CBRS and CBSD may be subsequently used when illustrating such a system and a device, or their specifications. Thus, a CBSD may be more generally referred to as a radio. Radio means a radio whose transmission is controlled or regulated by a spectrum access system.

Figure 1A:
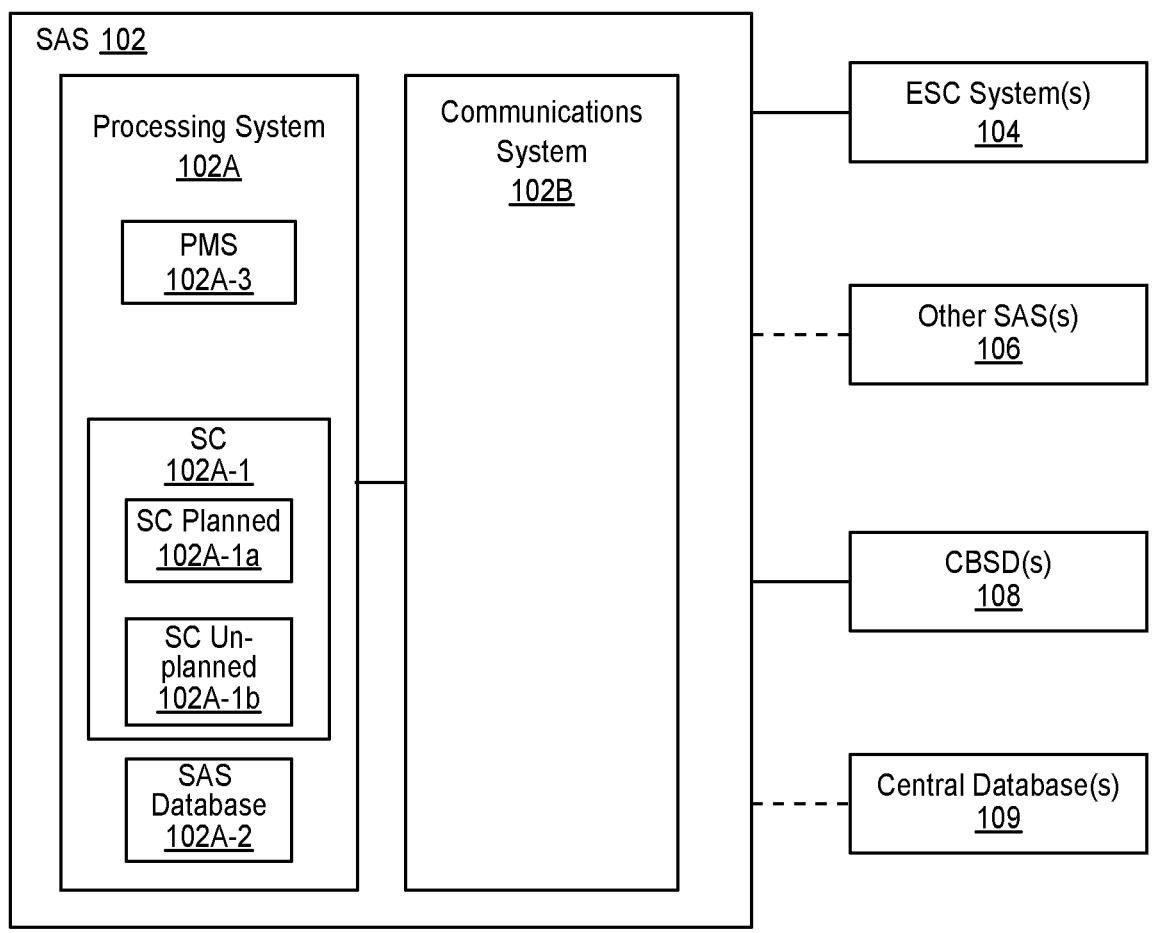
FIG. 1A illustrates a block diagram of one embodiment of a shared spectrum system 100 configured to permit radios access to share spectrum prior to a planned time.

FIG. 1A illustrates a block diagram of one embodiment of a shared spectrum system 100 configured to permit radios access to share spectrum prior to a planned time. The planned time is when planned spectrum coordination is performed. The shared spectrum system 100 comprises a SAS configured to permit radios access to share spectrum prior to a planned time (SAS) 102 and communicatively coupled to at least one CBSD (CBSD(s)) 108 whose transmissions are controlled or regulated by the SAS 102. Each CBSD is operated by a general authorized access user and/or a priority access licensee.

Optionally, the SAS 102 is coupled to at least one environmental sensing capability system (ESC system(s)) 104. Optionally, the SAS 102 is coupled to at least one central database 109, e.g., which has information about incumbent users (e.g., type of incumbent user(s), interference threshold power level of incumbent user(s), location of protection points corresponding to incumbent user(s)), and/or when certain incumbent users (such as satellite ground stations) and/or PAL CBSDs are scheduled to transmit in the shared spectrum.

Optionally, the SAS 102 is coupled to at least one other SAS (other SAS(s)) 106. The other SAS(s) 106 are configured to control the transmissions of other CBSD(s) (in the same shared spectrum in which the CBSD(s) 108 transmit or in overlapping frequency spectrum) and which are geographically proximate to the CBSD(s) 108. For example, such other CBSDs controlled by other SAS(s) 106 may include PAL and GAA users.

CBSD(s) (whose transmissions are controlled by other SAS(s) 106) may generate electromagnetic energy that overlaps the geographic region and frequency spectrum of the CBSD(s) 108 controlled by SAS 102, and thus must be accounted for by the SAS 102 when the SAS 102 performs interference analysis and authorizes transmission by CBSD(s) 108 in the shared spectrum. Alternatively, the shared spectrum system 100 and its PALs and GAA users, may generate electromagnetic energy that overlaps the geographic region of the other SAS(s) 106, and thus must be accounted for by the other SAS(s) 106 when the other SAS(s) 106 perform interference analysis, and authorize operation of CBSDs of PALs and GAA users (whose transmissions are controlled by the other SAS(s) 106). By coupling SASs whose CBSDs are geographically proximate to one another, each SAS can account for electromagnetic energy emitted from proximate CBSD(s) in those geographies.

Each ESC system detects, and communicates to the SAS 102, the dynamic presence of signal(s), e.g., from some incumbent user(s), such as radars. Alternatively, incumbent users can inform the SAS 102 that they are operating, e.g., by transmitting a signal beacon, or communicating with the central database(s) 109 which may be coupled to the SAS 102.

The SAS 102 also controls the operation (e.g., power levels and frequencies of operation) of the GAA user(s)' CBSD(s) so that the PAL CBSD(s) operate free of interference. In one embodiment, the SAS 102 includes a processing system 102A coupled to a communications system 102B. The processing system 102A controls the operation of CBSD(s) 108 that form part of the shared spectrum system 100.

The communications system 102B facilitates communications between the SAS 102 and other systems or devices, e.g., the CBSD(s) 108, the ESC system(s) 104, the central database(s) 109, and/or the other SAS(s) 106. In one embodiment, the communications system 102B includes a modem, e.g., an Internet data modem, a transceiver, and/or any other communications device(s) that can facilitate communications between the aforementioned devices.

Optionally, the processing system (or processing system circuitry) 102A may be a state machine, a neural network, and/or a quantum computer. If the processing system 102A includes a state machine, then optionally the state machine may comprise processor circuitry coupled to memory circuitry.

The SAS 102, e.g., the processing system 102A, comprises a spectrum coordination system (SC) 102A-1, and a SAS database 102A-2. Optionally, the SAS 102 includes a power modelling system (PMS) 102A-3. Optionally, the SC 102A-1 is implemented by software stored in the memory circuitry and executed by the processor circuitry, and the SAS database 102A-2 comprises data stored in the memory circuitry and processed by the processor circuitry. The components of the SAS 102 are provided for illustrative purposes only; other component(s) may be instead of those illustrated in FIG. 1A.

The conventional spectrum coordination system is configured to determine whether frequency spectrum sought in a grant request by a new CBSD can be allocated to the new CBSD by ensuring that if the SAS 102 grants the grant request that other CBSD(s) (whose transmission is controlled by the SAS 102 and the other SAS(s) 106) that such CBSD(s) will be free from interference.

The conventional spectrum coordination system also determines the maximum transmission power of CBSDs so that protection point(s) (which represents actual and/or potential incumbent user(s) and/or regions which are to remain free of interference from CBSDs) will be free of interference. The conventional spectrum coordination system does so by assessing aggregate interference at each protection point having a neighborhood encompassing geographic location(s) of CBSD(s), where the aggregate interference is generated by such CBSD(s) in the neighborhood. Neighborhood means a geographic area such as a circle or other shape) centered around a protection point.

Protection points may correspond to different types of incumbent users. An interference threshold level for a protection point may depend on a type of incumbent user that the protection point represents. Interference threshold levels may vary amongst incumbent user types.

Optionally, determination of maximum transmission power may be implemented with power allocation process that operates substantially accordingly to WInnForum general requirement R2-SGN-16 and using an iterative allocation process (IAP); however, WInnForum general requirement (requirement) R2-SGN-16 of WINNF-TS-0112 defines the IAP, and WINNF-TS-0112 is incorporated by reference herein in its entirety. The IAP determines maximum transmit power levels by allocating interference margin fairly to CBSDs in neighborhood(s) of protection point(s) proximate to the CBSDs. The IAP determines such transmit power levels by allocating interference margin fairly to the CBSDs in neighborhoods of protection point(s) of incumbent(s) for a certain combination of frequency spectrum mapped to the CBSDs. WInnForum general requirement (requirement) R2-SGN-16 of WINNF-TS-0112 defines the IAP and is incorporated by reference herein in its entirety. However, the power allocation system may be implemented in other ways to allocate, e.g., equitably, maximum transmission power of CBSDs.

The SC 102A-1 comprises a planned spectrum coordination system (SC planned) 102A-1a and an unplanned spectrum coordination system (SC unplanned) 102A-1b. Unless otherwise set forth, SC planned 102A-1a functions in the same manner as a convention spectrum coordination system described herein.

However, as described elsewhere herein, the SC 102A-1 differs from the conventional spectrum coordination system the inclusion of the SC unplanned 102A-1b. The SC unplanned 102A-1b determines a frequency spectrum and a maximum transmit power of a new CBSD.

The PMS 102A-3 is configured to model interference between two geographic points using at least one propagation model and may be used by the SC planned 102A-1a and the SC unplanned 102A-1b. However, in other embodiments, the function provided by the PMS 102A-3 may be integrated in the SC planned 102A-1a and/or the SC unplanned 102A-1b. The propagation model(s) may be used to determine path loss between to geographic points; knowing a transmit power of a CBSD in the shared spectrum, the path loss may then be used to determine a power (transmitted from the CBSD) at a geographic location (e.g., at another CBSD or a protection point) remote from the CBSD. Optionally, the PMS 102A-3 includes two or more propagation models one of which may be selected based upon geographic morphology (e.g., topography) between two geographic points. The propagation model(s) may include a free space path loss model, an irregular terrain model and/or a Hata model (or variation(s) thereof such as the enhanced Hata (eHata) model). The PMS 102A-3 may be utilized by the SC 102A-1 (including each of the SC planned 102A-1a and the SC unplanned 102A-1b) to determine interference power transmitted from a CBSD at a geographic location remote from the CBSD.

The SC planned 102A-1a and SC unplanned 102A-1a also include techniques for generating a neighborhood around each protection point and can utilize the PMS 102A-3 to determine the aggregate level of interference, at each protection point, in frequency spectra at each protection point from CBSD(s) in the neighborhood of the protection point. To this end, the propagation model(s) (e.g., free space path loss model, irregular terrain model and/or Hata model (or variations thereof such as the enhanced Hata (eHata) model)) are used to determine path loss between CBSDs and protection point(s).

The SAS database 102A-2 includes information about the CBSD(s) 108 and CBSDs (geographically proximate to the CBSD(s) 108) whose transmissions in some or all of the shared spectrum are controlled by other SAS(s) 106. Optionally, such CBSD information may include CBSD type (and thus maximum transmit power) and/or maximum transmit power, geographic location, antenna height, antenna gain, antenna pattern, antenna down tilt angle, and/or antenna azimuthal angle. The SAS database 102A-2 also includes information about the location, e.g., representative protection point(s), of incumbent users proximate to the CBSD(s) 108. Additionally, and/or alternatively, the SAS 102 may remotely obtain such information, e.g., form the central database(s) 109, the other SAS(s) 106 (e.g., from a full activity dump (FAD) from each of the other SAS(s) 106 to the SAS 102), and/or the corresponding CBSD(s). The SAS database 102A-2 also includes a network graph generated by execution of the SC planned 102A-1a. The network graph comprises one or more nodes, where each node comprises one or more GAA CBSDs, and each node is assigned a color. The SAS database 102A-2 may also include frequency spectrum allocation information for each color of each node of the network graph generated by SC planned 102A-1a. Optionally, the SAS database 102A-2 may include geographic morphology data about the geographic region where CBSDs whose transmission is controlled by the SAS 102 and optionally by other SAS(s) 106. For purposes of clarity, the new CBSD 103 is not part of the network graph, i.e., does not form a node or is not a member of a node of the network graph. However, as illustrated herein, the new CBSD 103 may be analyzed as if a new node consisted of the new CBSD 103 and the new node was part of the network graph.

The SC unplanned 102A-1b comprises techniques for providing a response to a grant request of a new CBSD before the planned execution of the SC planned 102A-1a. Thus, the SC unplanned 102A-1b facilitates earlier transmissions in the shared spectra by the new CBSD. Thus, more data can be communicated through the shared spectra, e.g., between user equipment and the new CBSD. Optionally, the SC unplanned 102A-1b consumes fewer computing resources than the SC planned 102A-1a. Optionally, the SC unplanned 102A-1b consumes less execution time than the SC planned 102A-1a.

Figure 1B:
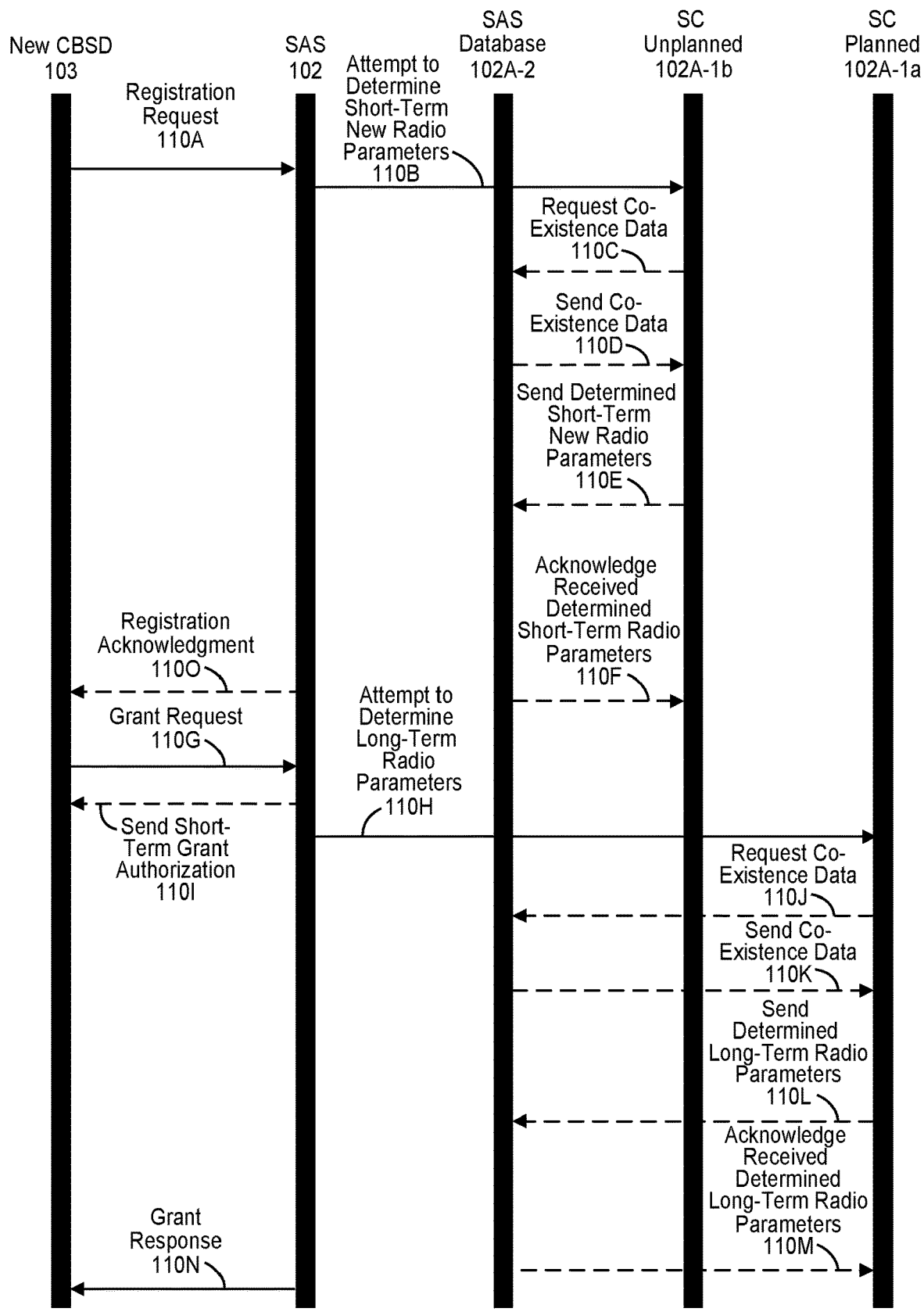
FIG. 1B illustrates a diagram of one embodiment of data flow between a new CBSD and a spectrum access system.

FIG. 1B illustrates a diagram of one embodiment of data flow between a new CBSD and a SAS 102. To the extent that data flow and methods shown in any of the Figures is described herein as being implemented in the system shown in FIG. 1A, it is to be understood that other embodiments can be implemented in other ways. Arrows in the data flow and blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

Until it is registered with the SAS 102, transmissions of the new CBSD are not controlled by the SAS 102. For purposes of clarity, even after the new CBSD registers with the SAS 102, the new CBSD will not be deemed to be a node of the network graph until a new network graph is generated by a next execution of SC planned 102A-1a after registration.

To be become one of the CBSD(s) 108 (and thus to be considered by the SAS 102 to be allowed to transmit in the shared spectrum), the new CBSD 103 sends a registration request 110A to the SAS 102. Optional, communications between CBSDs, e.g., the new CBSD 103, and the SAS 102 may be made through, at least in part, the Internet. When sending the registration request, the new CBSD 103 is unregistered with the SAS 102. Optionally, the new CBSD 103 provides data (or registration data) about the new CBSD 103 in the registration request that upon its receipt by the SAS 102 is stored in the SAS database 102A-2. The SAS database 102A-2 also stores similar data for other CBSD(s) of the CBSD(s) 108.

The data about the new CBSD 103 (CBSD type (and thus maximum transmit power), geographic location, antenna height, antenna gain, antenna pattern, antenna down tilt angle, and/or antenna azimuthal angle). Optionally, the data may include a new CBSD's maximum transmit power in lieu of the new CBSD's CBSD type, e.g., category A or B. Optionally, the data may include the new CBSD's minimum acceptable transmit power (or minimum transmit power); if the new CBSD were to operate at less than it minimum acceptable transmit power, then for example its coverage area would be impractically small, or it would be unable to communicate with another fixed wireless access CBSD. Upon receipt of this data, and subject to there not being erroneous data provided to the SAS 102 or the new CBSD 103 not being a CBSD that should be controlled by the SAS 102, the new CBSD 103 becomes part of the CBSD(s) 108 whose transmissions in shared spectrum are controlled by the SAS 102.

Upon receiving the registration request 110A from a new CBSD 103, the SAS 102 attempts to determine short term new radio parameters 110B for the new CBSD 103. Short term new radio parameters means parameters which can be used by new CBSD 103 to transmit in the shared spectrum until long term radio parameters generated at planned time(s) and are for the CBSD(s) authorized to transmit by the SAS after each planned time. The long-term radio parameters may include long term radio parameters for the new CBSD 103 if the SAS 102 is able to approve the grant request from the new CBSD 103 (e.g., allocate frequency spectrum in the shared spectrum and a maximum transmit power is equal to or larger than a minimum acceptable transmit power level for the new CBSD 103). Optionally, the long-term radio parameters are generated by the SC planned 102A-1a. For purposes of clarity, not every CBSD is guaranteed of receiving permission to transmit in shared spectrum at a planned time, e.g., when SC planned 102A-1a is executed. Long term new radio parameters may not always be generated for a CBSD, if there is no frequency spectrum in the shared spectrum to be allocated to the CBSD and/or if a determined maximum transmit power for the CBSD is not equal to or greater than a minimum acceptable power level of the CBSD. The long-term radio parameters include frequency spectrum (in which a corresponding CBSD receiving the long-term parameters is authorized to transmit) in the shared spectrum and a maximum transmit power.

The short-term new radio parameters include frequency spectrum (in which the new CBSD 103 is authorized to transmit) in the shared spectrum and a maximum transmit power. Optionally, the short-term new radio parameters include a color assigned to the new CBSD 103, where the color is assigned the frequency spectrum, and where the new CBSD with the assigned color is made part of the network graph generated by the last planned spectrum coordination analysis. Short term new radio parameters may not always be generated, e.g., if there is no frequency spectrum in the shared spectrum to allocated to the new CBSD 103 or if a determined maximum transmit power for the new CBSD 103 is not above a minimum acceptable power level.

To determine the short-term new radio parameters, the SC unplanned 102A-1b requests co-existence data 110C from the SAS database 102A-2. In response to such request, the SAS database 102A-2 sends the co-existence data 110D to the SC unplanned 102A-1b. The co-existence data includes the location of protection point(s), data about the CBSD(s) 108 such as all or some of the data types provided by the new CBSD 103 when registering, the location of other CBSD(s) (whose transmission is controlled by other SAS(s) 106, are geographically proximate to the CBSD(s) 108, data about which of the CBSD(s) 108 and other CBSD(s) are authorized to transmit, and/or morphology data for the geographic region about and encompassing the CBSD(s) 108 and the other CBSD(s) described above are located. Optionally, co-existence data includes corresponding criteria of interference, e.g., interference threshold levels (or indicators indicative of a corresponding interference threshold level) for one or more of the protection point(s), CBSD(s) 108, other CBSD(s), and/or nodes of the network graph. The co-existence data also may include the network graph (e.g., generated by a most recent execution of the SC planned 102A-1) based upon CBSD(s) 108 authorized to transmit by the SAS 102 in the shared spectrum and excluding the new CBSD 103.

The co-existence data may also include a chromatic number of the network graph. Chromatic number means a smallest number of colors needed to color nodes of a network graph so that no two nodes connected by an edge share the same color. The co-existence data may also include spectrum allocation information for the network graph, which may include frequency spectrum assigned to each color assigned to nodes of the network graph and a maximum transmit power allocated to each CBSD comprising the nodes of the network graph.

Upon receipt of the co-existence data, the SC unplanned 102A-1b may determine short term new radio parameters (as is further exemplified herein). The SC unplanned 102A-1b will determine a frequency spectrum and determine a maximum transmit power for the new CBSD 103 that may, or may not, be below a minimum useable transmit power level. Minimum useable transmit power means a transmit power of a CBSD that is provides a coverage area of a minimum range or radius. When the SC unplanned 102A-1b determines the short-term radio parameters, then optionally the SC unplanned 102A-1b sends the determined short term new radio parameters 110E to the SAS database 102A-2. Optionally, the SAS database 102A-2 stores the determined short term radio parameters. Optionally, the SAS database 102A-2 sends an acknowledgement of receipt of the determined short term new CBSD parameters 110F to the SC unplanned 102A-1b. Optionally, sometime after receipt of the registration request from the new CBSD 103, the SAS 102 sends a registration acknowledgement 110O to the new CBSD 103 to confirm that the new CBSD 103 has been registered with the SAS 102.

Prior to issuing a grant request, the new CBSD 103 may issue a spectrum inquiry. Optionally, in response to the spectrum inquiry, the SAS 102 sends to the new CBSD 103 the short-term radio parameters (or a subset of such parameters, e.g., just the determined frequency spectrum) determined by SC unplanned 102A-1b.

Prior to execution of the SC planned 102A-1a and after registration with the SAS 102, optionally the new CBSD 103 may send a grant request 110G to the SAS 102. Optionally, data (e.g., requested frequency spectrum of the shared spectrum) provided in the grant request is stored in the SAS database 102A-2. In the grant request, the new CBSD 103 requests authorization to transmit in requested frequency spectrum of the shared spectrum.

Upon receiving the grant request, the SAS 102 may undertake the following. To the extent that the frequency spectrum in the grant request is the same or a subset of the frequency spectrum in the generated short term new radio parameters, the SAS 102 will send a short-term grant authorization 110I to the new CBSD 103. If the requested frequency spectrum in the grant request does not match the frequency spectrum in the generated short term new radio parameters, the SAS 102 will disapprove the grant, but optionally will also include a frequency spectrum and a maximum transmit power (of the short term new radio parameters) in the grant response (e.g., under the operationParam section) to indicate to the new CBSD 103 a frequency spectrum and a maximum transmit power which the new CBSD 103 may include in a future grant request that likely will be approved by SAS 102. Therefore, the SAS 102 will effectively provide guidance to the CBSD so that it can subsequently request a frequency spectrum and a maximum transmit power that match the frequency spectrum and the maximum transmit power in the short-term parameters determined by SC unplanned. Optionally, the short term grant authorization is valid only until for a certain time period, e.g., from the time of transmission (or receipt) of the short term grant authorization through an end time when the long term radio parameters are next determined (e.g., when SC planned 102A-1a is next executed), an end time when the SAS 102 sends a grant response message to CBSD(s) authorized to transmit in the shared spectrum (e.g., as a result of the execution of the SC planned 102A-1a), or an end time prior to either of the foregoing. Optionally, the short-term grant authorization may include the end time. Thus, the short-term grant authorization may include a maximum transmit power, a frequency spectrum, and/or the end time. The end time means a time when the short-term grant authorization to transmit in shared spectrum expires. For purposes of clarity, the new CBSD 103 is only able to transmit if it receives a response, e.g., a short-term grant authorization, from the SAS 102.

At a planned time, e.g., midnight or one or more other times of day or another time period, the SC planned 102A-1a analyzes received grant requests from the CBSD(s) 108 and issues a grant response when possible to CBSD(s) that submitting grant request(s). This entails attempting to determine long term radio parameters 110H for CBSD(s) each of which submitted a grant request.

The SC planned 102A-1a requests co-existence data 110J from the SAS database 102A-2. The SAS database 102A-2 sends the co-existence data 110K to the SC planned 102A-1a. The co-existence data sent by the SAS database 102A-2 to the SC planned 102A-1a includes some or all of the data sent to the SC unplanned 102A-1b and data for the new CBSD 103. The SC planned 102A-1a generates long term radio parameter(s), e.g., maximum transmit power for frequency spectrum requested by CBSD(s) submitting grant requests. The SC planned 102A-1a undertakes this analysis utilizing conventional techniques as described in WINNFTS-0112, which is hereby incorporated by reference in its entirety.

Optionally, the SC planned 102A-1a sends the determined long term radio parameters 110L to the SAS database 102A-2 for storage. Optionally, the SAS database 102A-2 acknowledges receipt of the long-term radio parameters 110M. Optionally, when it can in response to grant request(s), the SAS 102 issues a grant response 110N to some or all of the CBSD(s) that submitted a grant request to the SAS 102. Thus, optionally, the SAS 102 may send a grant response 110N to the new CBSD 103.

Figure 2A:
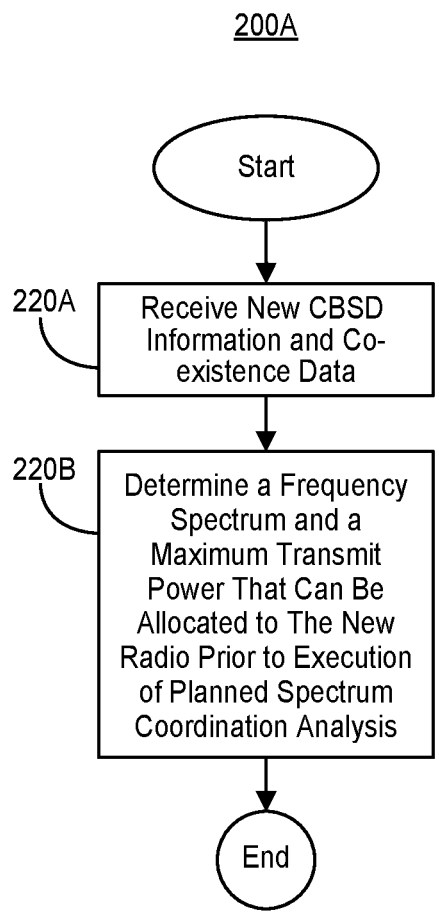
FIG. 2A illustrates a flow diagram of one embodiment of a method of determining frequency spectrum and maximum transmit power to allocate, to a new citizens broadband radio service device, prior to execution of planned spectrum allocation.

FIG. 2A illustrates a flow diagram of one embodiment of a method 200A of determining frequency spectrum and maximum transmit power to allocate, to a new CBSD, prior to execution of planned spectrum allocation. The method 200A may determine short term radio parameter(s) (frequency spectrum and/or maximum transmit power). Prior to next determination of long-term radio parameter(s), the new CBSD may register with the SAS and provide CBSD information that will be used by SC unplanned for determining the frequency spectrum allocation for the new registering CBSD. When the new CBSD subsequently submits a spectrum inquiry or grant request, the SAS will provide, to the new CBSD, a response based on the determined short term radio parameter(s). When responding to a grant request and when a frequency spectrum of the short-term radio parameter(s) does not match with the frequency spectrum requested by the new CBSD, then the SAS will disapprove the grant response. Optionally, a grant response, e.g., in a form of a message, may be sent by, e.g., the SAS. The grant response may include the maximum transmit power and the frequency spectrum of the short-term radio parameter(s) that the new CBSD can subsequently submit in a grant request and will likely be approved, e.g., by the SAS. If the requested frequency spectrum comprises a portion of or the entirety of the frequency spectrum of the short-term radio parameter(s), then the grant request will be approved, e.g., by the SAS, and a grant authorization will be sent to the new CBSD. Upon receipt of such grant authorization, the new CBSD can transmit in shared spectrum prior to the next determination of long-term radio parameters. Optionally, the method 200A is executed by SC unplanned 102A-1b, another component of the SC 102A-1, another component of the SAS 102, or by another system.

FIG. 2A illustrates a flow diagram of one embodiment of a method 200A of determining frequency spectrum and maximum transmit power to allocate, to a new CBSD, prior to execution of planned spectrum allocation.

In block 220A, information about the new CBSD and co-existence information (or data) is received. Co-existence data is described elsewhere herein. Such information may be received from the new CBSD, the SAS database, the central database(s), and/or other sources.

Such information may include a network graph. The network graph comprises nodes. One or more sets of two nodes of the network graph may be connected by an edge. Each node comprises one or more GAA CBSDs operating in the same portion of shared spectrum. The CBSD(s) comprising nodes of the network graph may be controlled by the SAS 102 or the other SAS(s) 106 (i.e., peer SAS(s)). Each node is assigned a color. Each node is also assigned a frequency spectrum in the shared spectrum. Nodes of the same color are not necessarily allocated the same frequency spectrum, e.g., when a network graph comprises two or more separate connected sets; however, nodes of a connected set and having the same color are allocated the same frequency spectrum. An edge represents interference by one of the two CBSDs with the other CBSD, and possibly vice versa. Optionally, the co-existence information includes data about at least one protection point whose neighborhood encompasses a geographic location of the new radio. In block 220B, a frequency spectrum and a maximum transmit power that can be allocated to the new radio are determined prior to execution of planned spectrum coordination analysis and based upon whether the new radio forms an edge with at least one node of at least one connected set, wherein an edge occurs when a criterion of interference at either the new radio due to at least one radio of which the at least one node comprises, or the at least one node due to the new radio, exceeds a corresponding threshold level.

Figure 2B:
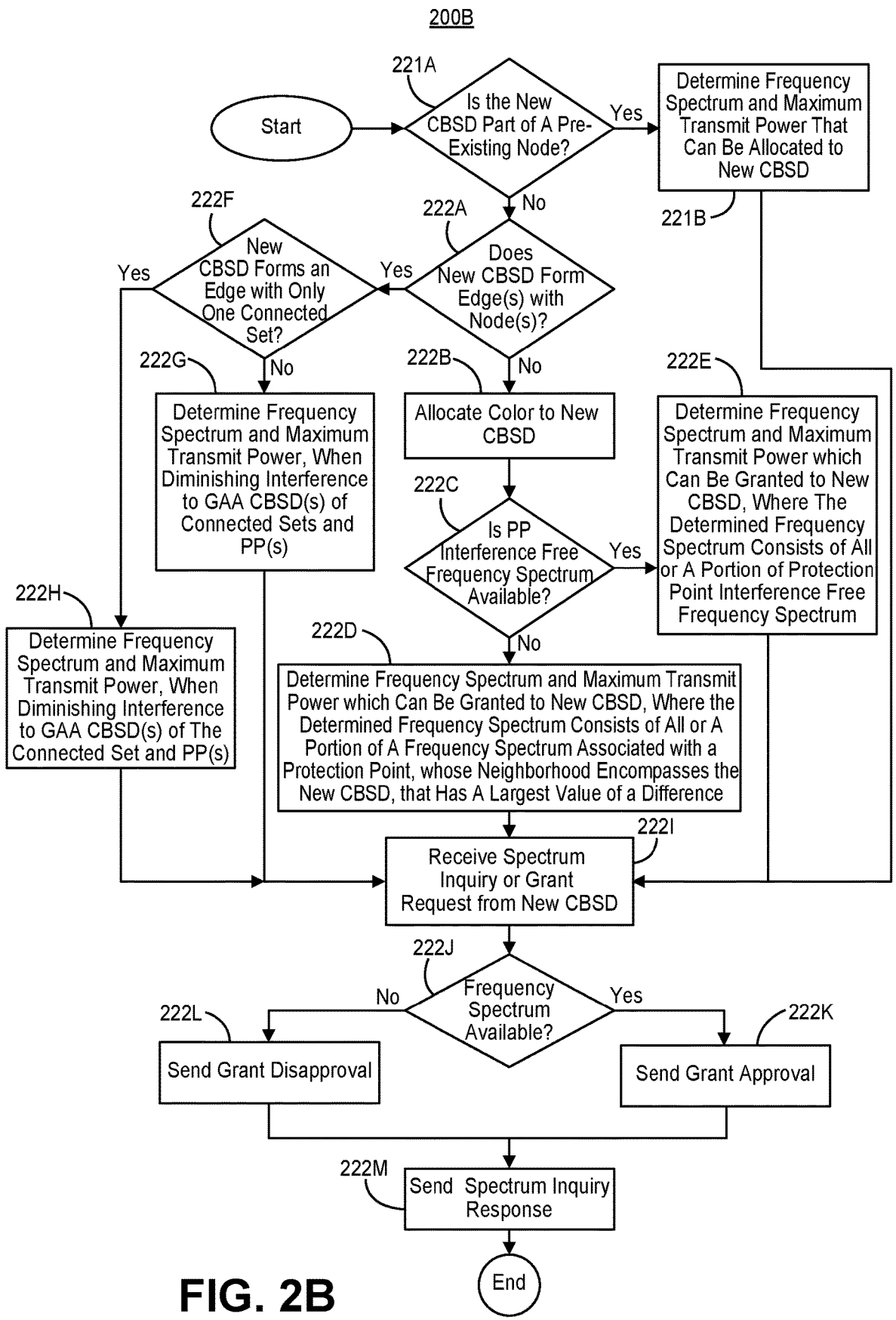
FIG. 2B illustrates a flow diagram of one embodiment of a method of implementing block 220B of FIG. 2A.

FIG. 2B illustrates a flow diagram of one embodiment of a method 200B of implementing block 220B of FIG. 2A. In optional block 221A, whether the new CBSD is part of a pre-existing node is determined. Whether the new CBSD is part of a pre-existing node can be determined using new CBSD information and/or co-existence data provided during registration. Optionally, the new CBSD may identify that it is part of a pre-existing grouping information. If the new CBSD is part of a pre-existing group, then the new CBSD is part of a pre-existing node comprising at least one pre-existing CBSD of the pre-existing group. If the new CBSD is not part of a pre-existing node, then proceed to block 222A. If the new CBSD is part of a pre-existing node, then in optional block 221B, a frequency spectrum (allocated to the pre-exiting node) and a maximum transmit power are determined for the new CBSD (which can be allocated to the new CBSD)—if the new CBSD does not create an edge with another node assigned the same frequency spectrum or a part thereof. Optionally, upon completing block 221B, then proceed to block 222I.

Figure 2C:
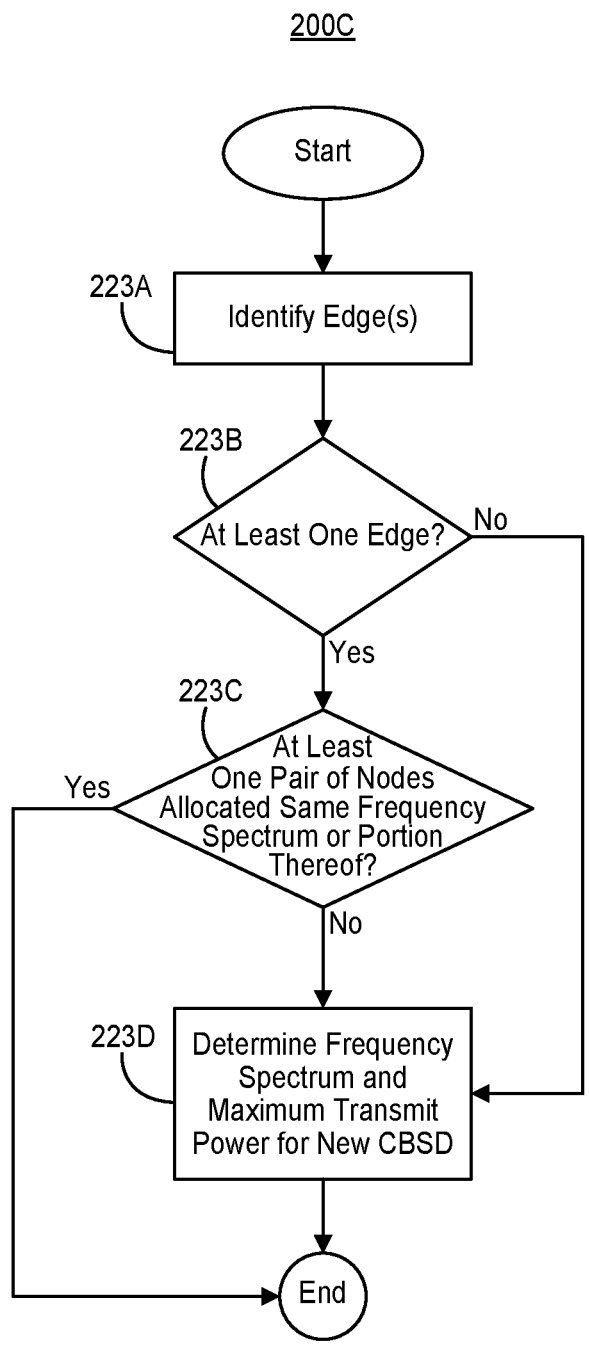
FIG. 2C illustrates a flow diagram of implementing one embodiment of a method of implementing block 221B of FIG. 2B.

FIG. 2C illustrates a flow diagram of implementing one embodiment of a method 200C of implementing block 221B of FIG. 2C. The illustrated embodiment is exemplified using fixed wireless access (FWA) CBSDs but can be applicable to other types of CBSDs (that are not FWA CBSDs).

If the new CBSD identifies that it is part of a pre-existing group of at least one CBSD, previously registered with the SAS, comprising a pre-existing single node in the network graph and which has been allocated a frequency spectrum (e.g., by planned spectrum coordination performed by the SAS)[2], then the new CBSD is expected to (a) request the same frequency spectrum that has been allocated to the existing group of CBSDs that belong to the same node, or (b) issue a spectrum inquiry; thus, the SAS would receive such request or spectrum inquiry. In such an event, whether the new CBSD causes at least one new edge to be created between the node comprising the new CBSD and at least one other preexisting node is determined (e.g., by the unplanned spectrum coordination performed by the SAS); if at least one new edge is created, whether any pair of nodes, connected by one of the at least one new edge, are allocated the same frequency spectrum or a portion thereof is determined (e.g., by the unplanned spectrum coordination performed by the SAS).

[2]Optionally, the new CBSD may be a CPE that is part of a pre-existing fixed wireless access (FWA) group of at least one CBSD comprising a pre-existing node.

To implement this, in block 223A, each edge created between the pre-existing node comprising the new radio and another node ("pair of nodes") is identified. Then, in block 223B, whether there is at least one identified edge is determined. If no edges are identified, then proceed to block 223D. If no edges are identified, then optionally frequency spectrum requested or identified by the new radio (e.g., from or to the SAS) will be approved or identified as available, e.g., by the unplanned spectrum coordination performed by the SAS. If at least one edge is identified, then for each identified edge, in block 223C, whether both nodes, of at least one pair of nodes, are allocated the same frequency spectrum or a portion thereof is determined. For each identified edge, if both nodes of the pair of nodes are not allocated the same frequency spectrum or a portion thereof, then, in block 223D, a frequency spectrum and a maximum transmit power for the new CBSD is determined, e.g., by the unplanned spectrum coordination performed by the SAS. The maximum transmit power of the new CBSD is determined based on the interference margin of any protection point(s) whose neighborhood(s) encompass the geographic location of the new CBSD and are using the requested or identified frequency spectrum and the interference level at such protection points, as illustrated elsewhere herein. The foregoing may be done when the frequency spectrum is authorized by a grant request response (or optionally is identified as available in a spectrum inquiry response).

If, in block 223C, both nodes of a pair of nodes are determine to be allocated the same frequency spectrum or a portion thereof, then the frequency spectrum requested by the new CBSD is not allocated or identified (e.g., by the unplanned spectrum coordination performed by the SAS); thus, optionally, a grant request response is issued, e.g., by a SAS, to the new CBSD denying a grant request of the new radio or a spectrum inquiry is issued, e.g., by the SAS, to the new CBSD identifies no frequency spectrum. If, in block 223C, no pairs of nodes are allocated the same frequency spectrum or a portion thereof, then the requested frequency spectrum is allocated or identified (e.g., by the unplanned spectrum coordination performed by the SAS); thus, optionally, a grant request response to the new CBSD authorizing the grant request is issued (e.g., by the SAS) or a spectrum inquiry response is issued (e.g., by the SAS) to the new CBSD identifying the inquired about frequency spectrum as being available is issued (e.g., by the SAS).

Returning to FIG. 2B, in block 222A, whether the new CBSD forms edge(s) with at least one node of the network graph is determined. An edge means that a criterion of interference at a CBSD or a node consisting of one or more CBSD(s) exceeds a threshold level. Optionally, the threshold level is an interference threshold level, and optionally the interference threshold level may be −96 dBm/10 MHz.

Optionally, determination of an edge may be performed by as follows. Optionally, there may be two type of CBSD(s): a fixed wireless access (FWA) CBSD and a cellular CBSD. Each CBSD has a coverage area whose boundaries are defined by detectable received signal level which optionally may be −96 dBm/10 MHz. Cellular CBSD means a CBSD, e.g., a base station, having an omni directional antenna pattern. User equipment within the coverage area of the base station may communicate with the base station, and vice versa.

The fixed wireless access CBSD may be a base station or consumer premises equipment (CPE). The FWA CBSD is used to provide point to point communications in a coverage area of the FWA CBSD in the shared spectrum. FWA CBSDs communicate with one another. Thus, CPE in the coverage area of a base station may communicate with the base station, and vice versa. Optionally, the CPE may be located in or on a building such as a house or an office building. The FWA CBSD has an antenna radiation pattern with one or more narrow width antenna beams so increased, e.g., maximum, radiated energy is directed through a corresponding antenna beam between the FWA CBSD and a corresponding CPE or base station. Fixed wireless access (FWA) cluster means a base station and CPE(s) which communicate with the base station.

The cellular CBSD optionally has an omnidirectional antenna radiation pattern. Because it optionally has an omnidirectional antenna radiation pattern, the coverage area of a cellular CBSD is typically smaller, e.g., 1 km, than a coverage of a FWA CBSD. The cellular CBSD is intended to communicate with user equipment in the coverage area of the cellular CBSD. Optionally, user equipment may be portable devices (e.g., such as cell phones, tablets, laptop computers, and/or any other portable devices, fixed devices (e.g., Internet of Things devices), and/or any other type of devices.

Optionally, some or all fixed wireless access CBSDs use time division multiplexing. Optionally, some or all of the FWA CBSDs which use time domain duplexing (TDD) may be synchronized. For FWA CBSD that use TDD and are synchronized, transmissions from all base stations are sent during a same time slot or time period, and transmissions from all CPE are sent during a different time slot or time period. When FWA CBSDs are synchronized, the following analysis may be used to determine if an edge is formed between a new CBSD that is a fixed wireless access CBSD. Else, an alternative technique may be used for FWA CBSDs when the FWA CBSDs are not synchronized; for example, this may be accomplished by determining if interference at a base station due to another base station is in excess of a threshold power level. Optionally, some or all cellular CBSDs and user equipment use TDD; optionally, some or all cellular CBSDs are synchronized.

If the new CBSD is a FWA CBSD that is a base station, then to determine if an edge is formed between the base station and node(s) of the network graph by assessing if interference from the base station at any CPE(s) of FWA cluster(s) of node(s) of the network graph exceeds a corresponding interference threshold level, e.g. −96 dBm/10 MHz, and/or vice versa. If the new CBSD is a FWA CBSD that is a CPE, then determine if an edge is formed between the CPE and node(s) of the network graph by assessing if interference at the CPE from any base station(s) of FWA cluster(s) of node(s) of the network graph exceeds a corresponding interference threshold level, and/or vice versa.

If the new CBSD is a cellular CBSD then formation of an edge between the new cellular CBSD and node(s) of the network graph may be determined as follows. An edge is formed between the new cellular CBSD and a node of the network graph if a percentage of coverage area of the new cellular CBSD overlapping a coverage area of a cellular CBSD of the node exceeds a corresponding threshold coverage area percentage level (e.g., thirty percent) and/or vice versa.

When determining coverage area, a propagation model must be selected to determine propagation loss over distance (e.g., with respect to geographic location displaced from the FWA CBSD or cellular CBSD). By knowing a transmit power, e.g., a determined maximum transmit power, of a FWA CBSD or a cellular CBSD, and propagation loss, the power level at geographic locations can be determined. The propagation model used depends upon geographic morphology (e.g., rural, urban, suburban, water, etc.) of terrain between the CBSD and the displaced geographic location, e.g., the new CBSD and a geographic location in a coverage area of a CBSD of a node of the network graph. Optionally, the geographic morphology is determined by ascertaining the geographic morphology at the receiving CBSD. First, geographic morphology is first determined, and then secondly a propagation model is selected based upon the determined geographic morphology. Optionally, geographic morphology may be stored and obtained from the SAS database 102A-2 or the central database(s) 109, e.g., at the U.S. Geological Survey. The selected propagation model is used to determine a propagation loss between two geographic locations. Optionally, the foregoing analysis may be performed by the PMS 102A-3.

Optionally, if the new CBSD and the CBSD(s) comprising node(s) of the network graph comprise two or more different types of CBSDs (e.g., CBSDs having different antenna radiation patterns such as a cellular CBSD and a FWA CBSD), an edge weight is determined for each edge formed in the network graph and by the new CBSD. Edge weights allow interferences by different types of CBSDs to be compared as will be subsequently illustrated. The edge weigh is a function of coverage overlap (for a cellular CBSD) and a magnitude of interference, optionally above a corresponding interference threshold level, for a FWA CBSD.

If the new CBSD forms an edge with a node of the network graph, then in block 222F, whether the new CBSD forms an edge with only one connected set of the network graph is determined. A connected set means a unique set of at least two nodes, where at least two of the nodes have an edge, or a unique node with no edge to any other node. If the new CBSD does not interfere with only one connected set (i.e., the new CBSD interferes with more than one connected set), then in block 222G, a frequency spectrum and maximum transmit power which can be granted to the new CBSD are determined, when diminishing, e.g., minimizing, interference to (a) GAA CBSD(s) (comprising node(s) of connected sets each of which with the new CBSD forms an edge) and (b) protection point(s) each of which is associated with a frequency spectrum that includes all or part of the determined frequency spectrum and each of which has a neighborhood encompassing a geographic location of the new CBSD. If the new CBSD interferes with only one connected set, then in block 222H, a frequency spectrum and maximum transmit power which can be granted to the new CBSD are determined, when diminishing, e.g., minimizing, interference to (a) GAA CBSD(s) (comprising node(s) of a connected set with which the new CBSD forms an edge) and (b) protection point(s) each of which is associated with a frequency spectrum that includes all or part of the determined frequency spectrum and each of which has a neighborhood encompassing a geographic location of the new CBSD.

If the new CBSD does not form an edge with a node, then in block 222B, a color is allocated to the new CBSD. The allocated color may be a color already be assigned to node(s) in the existing network graph and which comprise CBSD(s) or may be a new color not assigned to node(s) in the network graph. The network graph means the network graph generated during the last planned spectrum coordination, e.g., execution of SC planned 102A-1*a*. Note, even if a color already assigned to node(s) in the network graph is reused for the node consisting of the new CBSD, the color assigned to the new CBSD may be assigned a different frequency spectrum than is assigned to the same color used for node(s) in the network graph when no edge is formed between the node consisting of the new CBSD and the other nodes assigned the same color as the node consisting of the new CBSD.

In block 222C, availability of a protection point (PP) interference free frequency spectrum available to grant to the new CBSD is determined. Protection point interference free frequency spectrum means frequency spectrum in the shared spectrum which does not overlap, in whole or in part, a frequency spectrum associated with a protection point in whose neighborhood the new CBSD is geographically located. A neighborhood means a geographic area around a protection point, e.g., defined by a radius or other geometric description. Optionally, the determined available protection point interference free frequency spectrum must exceed a minimum bandwidth, e.g., 5 MHz; if the minimum bandwidth is unavailable, then this is akin to protection point interference free frequency spectrum being unavailable.

If there is a protection point interference free frequency spectrum available to grant to the new CBSD, then in block 222E, a frequency spectrum and a maximum transmit power are determined, where the determined frequency spectrum consists of all or a portion of a protection point interference free frequency spectrum. Optionally, this can be done by selecting the largest contiguous bandwidth of frequency spectrum of protection point interference free frequency spectrum, and by selecting a maximum transmit power of the new CBSD that the new CBSD is capable of transmitting, e.g., as specified directly or indirectly in registration information submitted for the new CBSD. Optionally, the largest contiguous bandwidth is bounded by a defined maximum allowable bandwidth, e.g., 20 MHz.

Optionally, the frequency spectrum allocated to the new CBSD is determined to be a minimum of a frequency spectrum requested by the new CBSD and the selected protection point interference free frequency spectrum.

If there is no protection point interference free frequency spectrum available to grant to the new CBSD, then in block 222D, a frequency spectrum and a maximum transmit power are determined, where the determined frequency spectrum consists of all or a portion of a frequency spectrum associated with a protection point, whose neighborhood encompasses the geographic location of the new CBSD, that has the largest value of a difference determined by when the new CBSD's interference level at the protection point is subtracted from the determined interference margin of the protection point. Optionally, in block 222I, a spectrum inquiry or a grant request is received from the new CBSD. The grant request specified specific frequency spectrum in the shared spectrum which the new CBSD desires in which to transmit. The spectrum inquiry is a request from the new CBSD to ascertain whether shared spectrum controlled by the SAS is available in which the new CBSD could transmit. Optionally, the spectrum inquiry is a request about specific frequency spectrum in the shared spectrum in which the new CBSD desires to transmit.

In optional block 222J, whether frequency spectrum, e.g., the desired frequency spectrum, in the shared spectrum is available for the new CBSD is determined. In the case of the spectrum inquiry, whether any of the frequency spectrum of the shared spectrum is available (in which the new CBSD could transmit) is determined. For a grant request, which specifies a requested frequency spectrum, whether the requested frequency spectrum is available is determined, or optionally whether any bandwidth is available is determined.

Optionally, if frequency spectrum is not available, then proceed to block 222L if a grant request was received from the new CBSD or proceed to block 222M if a spectrum inquiry was received from the new CBSD. Optionally, if the frequency spectrum is available (i.e., the requested frequency spectrum is contiguous with or a subset of the determined frequency spectrum), then proceed to block 222K if a grant request was received from the new CBSD or proceed to block 222M if a spectrum inquiry was received from the new CBSD. Optionally, in block 222M, a spectrum inquiry response is sent to the new CBSD indicating whether or not the frequency spectrum specified in the spectrum inquiry was determined to be available, and optionally a corresponding maximum transmit power which can be utilized if the frequency spectrum is available.

Optional blocks 222K and 222L are alternative to optional block 222M. In optional block 222K, a grant approval (authorizing use of the requested frequency spectrum and specifying a maximum transmit power) is sent to the new CBSD. In optional block 222L, a grant disapproval (not authorizing use of the requested frequency spectrum) is sent to the new CBSD. Optionally, the grant disapproval includes a frequency spectrum and a maximum transmit power which will likely be authorized, e.g., by the SAS, in a future request.

Figure 3:
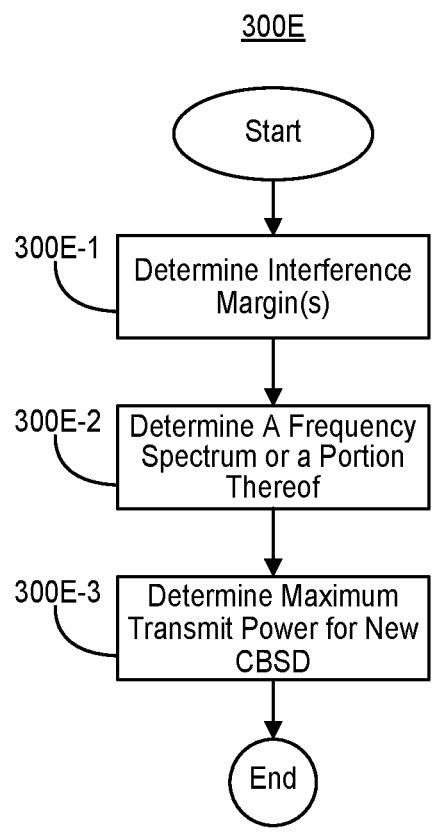
FIG. 3 illustrates a flow diagram of one embodiment of a method of how to determine a frequency spectrum and maximum transmit power which can be granted to the new citizens broadband radio service device when no protection point interference free frequency spectrum is available.

FIG. 3 illustrates a flow diagram of one embodiment of a method 300E of how to determine a frequency spectrum and maximum transmit power which can be granted to the new CBSD when no protection point interference free frequency spectrum is available. Thus, FIG. 3 illustrates one embodiment of implementing block 222D of FIG. 2B; however, block 222D can be implemented in other ways.

In block 300E-1, for each protection point having a neighborhood in which the new CBSD is geographically located, an interference margin is determined for a frequency spectrum, or each portion thereof, associated with the protection point. The interference margin constrains interference at the protection point from the new CBSD.

In block 300E-2, a frequency spectrum, or each portion thereof, associated with a protection point (in whose neighborhood the new CBSD is geographically located), having a largest value of a difference (when the new CBSD's interference level at the protection point is subtracted from the determined interference margin) is determined. For purposes of clarity −1 is a larger value than −10. Optionally, the new CBSD is assigned the determined frequency spectrum, or a portion thereof, of the protection point.

In block 300E-3, a maximum transmit power is determined for the new CBSD by reducing a maximum transmit power of the new radio that the new radio is capable of transmitting so that an interference level of the new radio, determined with a reduced transmit power of the new radio, at the protection point is equal to or less than a value of the interference margin.

Optionally, the maximum transmit power is determined based on the interference margin at selected frequency spectrum or a portion thereof. Using a propagation model selected based upon topographical morphology between the new CBSD and the protection point, a maximum transmit power is determined. The maximum transmit power is determined so that an interference level of the new CBSD at the protection point is equal to or less than a value of the interference margin. Optionally, a value lower than the interference margin, e.g., by 1 dB, may be used to determine the maximum transmit power of the new CBSD so that remaining interference margin can be utilized by one or more other new CBSDs prior to planned spectrum coordination. Optionally, the new CBSD is assigned the determined maximum transmit power.

FIG. 4 illustrates a flow diagram of one embodiment of a method 400H of determining a frequency spectrum and a maximum transmit power which can be granted to the new CBSD when there is an edge with only one connected set. Thus, FIG. 4 illustrates an optional embodiment of implementing block 222H of FIG. 2B; however, block 222H can be implemented in other ways.

In block 400H-1 whether an increase, in chromatic number of the network graph increases if the new radio is added as a node to the network graph is determined. The chromatic number changes if a node consisting of the new CBSD is connected by at least one edge to nodes of the network graph so that a new color must be assigned to the node consisting of the new CBSD to avoid two nodes sharing and edge and the same color. For purposes of determining if the chromatic number changed, the node representing the new CBSD is considered part of the network graph.

If the chromatic number increases with an addition of a new CBSD, then in block 400H-2, whether there is available frequency spectrum of one connected set is determined. Available frequency spectrum, of a connected set, means frequency spectrum that is not assigned to color(s) assigned to node(s), with edge(s) with the new CBSD, of the connected set and not a frequency spectrum, or portion thereof, that would result in interference power at any protection point(s) (whose neighborhood(s) encompass the geographic location of the new CBSD) having a level equal to or greater than the value of a corresponding protection point's determined interference margin. If there are multiple available frequency spectrum, or portion(s) thereof, of the connected set, then the available frequency spectrum, or a portion thereof, with the greatest difference between the interference margin and interference power level from new CBSD is selected. If there is available frequency spectrum, then in block 400H-3 assign a new color to a node comprising the new CBSD, where the new color is a color that is not assigned to a node of the connected set. In block 400H-4, at least a portion of the available frequency spectrum is assigned to the new color. Optionally, the assigned at least a portion of the available frequency spectrum does not exceed a maximum bandwidth threshold, e.g., 20 MHz.

If there is no available frequency spectrum, then in block 400H-5, a node of the connected set with which the new CBSD interferes the least is determined. Optionally, least interference may be determined using edge weights (described elsewhere herein). Optionally, a lower edge weight corresponds to a lower interference level. Thus, after determining edges between the new CBSD and nodes of the connected set and determining edge weights for each determined edge, a lowest edge weight may be determined to identify a node of the connected set with which the new CBSD interferes the least.

In block 400H-6, a color of the determined node of the connected set with the least interference is determined; the frequency spectrum assigned to the color of the determined node is assigned to the new CBSD. In block 400H-7, a transmit power of the new CBSD is determined so that interference from the new CBSD at the determined node is below an interference threshold level so that the edge is eliminated between the new CBSD and the determined node. Optionally, this can be accomplished by using the modelling techniques referred to in block 400H-5 and iteratively reducing the transmit power of the new CBSD until no edge is formed with the determined node, while enhancing, e.g., optimizing the transmit power of the new CBSD.

In block 400H-8, whether interference from the new CBSD at any protection point(s) (associated with the frequency spectrum assigned to the new CBSD and whose neighborhood(s) encompass the geographic location of the new CBSD) is greater than any of the interference margin(s) of the protection point(s). Optionally, this can be performed by determining a terrain morphology corresponding to terrain between each of the protection point(s) and the new CBSD. Then, a propagation model is selected for each pair of each of the protection point(s) and the new CBSD based upon the determined terrain morphology. Using the corresponding selected propagation model, determine the interference level at each of the protection point(s) due to the new CBSD. The interference margin (at the frequency spectrum assigned to the new CBSD) at each of protection point(s) is then determined as illustrated elsewhere herein. Then, whether the new CBSD's level of interference at any of the protection point(s) is greater than any of the determined interference margin(s) of the protection point(s) at the frequency spectrum assigned to the CBSD is determined. If the new CBSD's level of interference is greater than any of the interference margin(s) of the protection point(s), then in block 400H-9, the transmit power of the new CBSD is reduced so that interference from the new CBSD at any of the protection point(s) is not greater than any interference margin of the protection points. Optionally, the reduction in transmit power may be from a requested transmit power or from a maximum transmit power at which the CBSD is capable of transmitting. Optionally, the new CBSD power reduction is increased by an amount, e.g., 1 dB, so that interference margin(s) (at protection point(s) that had an interference greater than an interference margin) remain and can be utilized by one or more other new CBSDs prior to planned spectrum allocation. The reduction can be performed by iteratively reducing the transmit power of the new CBSD, while enhancing, e.g., maximizing, the transmit power of the new CBSD. Using the selected propagation model for the protection point, the interference level at the determined protection point can be determined for each iteration.

If the chromatic number was determined not to have changed in block 400H-1, then in block 400H-10, the color(s) of the nodes in a connected set whose CBSDs are not interfered with by the new CBSD are determined. In other words, the color(s) of the nodes in the connected set whose CBSDs from no edge with the new CBSD are determined.

In block 400H-11, it is determined whether the number of color(s) (of the nodes of the connected set whose CBSDs are not interfered (i.e., form no edge, with by the new CBSD) is greater than one. If the number of color(s) is greater than one, then in block 400H-12 a color for the new CBSD is selected. Optionally, the color may be selected as follows. A color may be selected that is used by nodes of the network graph where no edges are formed. The color may be randomly selected from available colors that meet this criterion or may be selected to maximize new CBSD transmit power. To maximize new CBSD transmit power, a color is selected that has a largest value of a difference (when the new CBSD's interference level at a protection point is subtracted from the determined interference margin) is determined. For purposes of clarity −1 is a larger value than −10.

The new CBSD's interference at each protection point has an upper bound that is equal to an interference margin, at the frequency spectrum assigned to the new CBSD, at the protection point. Interference margin is a buffer that effectively reduces the maximum allowable aggregate interference at a protection point, but is available to new CBSD(s) requesting transmit power before execution of planned spectrum coordination. Portion(s) of the interference margin may be shared with other SAS(s) that control CBSD(s) geographically located in the neighborhood of the protection point(s). Such interference margin may be shared equally or unequally amongst the SAS and other SAS(s). Different protection point types may have different interference threshold levels.

Optionally, different protection points types may have different interference threshold levels, e.g., maximum allowable aggregate interference levels and/or different interference buffers.

In block 400H-13, a frequency spectrum of the selected color is determined. In block 400H-14, the frequency spectrum associated with the selected color is assigned to the new CBSD. Then, proceed to block 400H-9.

If in block 400H-11 it is determined that the number of colors is not greater than one (i.e., is equal to one), then in block 400H-15, a frequency spectrum of the one color is determined. Then proceed to block 400H-14.

FIG. 5 illustrates a flow diagram of one embodiment of a method 500G of determining a frequency spectrum and a maximum transmit power which can be granted to the new CBSD when there is an edge with more than one connected set. Thus, FIG. 5 illustrates an optional embodiment of implementing block 222G of FIG. 2B; however, block 222G can be implemented in other ways.

In block 500G-1, a cardinal value of a set of each frequency spectrum of node(s) having an edge with the new CBSD is determined. For purposes of clarity, such node(s) are node(s) in the network graph. In block 500G-2, a maximum of a chromatic number of each connected set having an edge with the new CBSD is determined.

In block 500G-3, it is determined whether the cardinal value of the set of frequency spectrum(s) of node(s) having an edge with the new CBSD is less than the maximum of the chromatic number of each connected set having an edge with by the new CBSD.

If the cardinal value of the set of frequency spectrum(s) of node(s) having an edge with the new CBSD is determined to be less than the maximum of the chromatic number of each connected set having an edge with the new CBSD, then, in block 500G-4, a frequency spectrum is selected for the new CBSD that is different than the frequency spectrum used by CBSD(s) of node(s) having an edge with the new CBSD. The selected frequency spectrum may be chosen from any of the frequency spectrum used by CBSD(s) of node(s) of the network graph with which the new CBSD does not form an edge. Optionally, to enhance, e.g., maximize, transmit power of the new CBSD, a frequency spectrum is selected that is a frequency spectrum used by CBSD(s) of node(s) of the network graph with which the new CBSD does not form an edge and which allows the new CBSD to transmit a highest maximum transmit power (corresponding to frequency spectrum, or a portion thereof, of a protection point whose neighborhood encompasses the geographic location of the new CBSD) with respect to maximum transmit power(s) that the new CBSD would be permitted to utilize in frequency spectrum(s) (or a portion thereof) of protection point(s) that should be free of interference (as defined elsewhere herein) whose neighborhood(s) encompass the geographic location of the new CBSD. Thus, optionally determination of the highest maximum transmit power may be accomplished by determining a largest value of a difference (when the new CBSD's interference level at each protection point (whose neighborhood encompasses the geographic location of the new CBSD) is subtracted from the determined interference margin at the protection point) is determined. For purposes of clarity $-1$ is a larger value than $-10$.

If the cardinal value of the set of frequency spectrum(s) of node(s) having an edge with the new CBSD is determined to not be less than the maximum of the chromatic number of each connected set having an edge with by the new CBSD, then in block 500G-5, whether there is available frequency spectrum(s) of any connected set(s) is determined, where each of the connected set(s) has node(s) with edge(s) with the new CBSD. An available frequency spectrum of connected set(s) means frequency spectrum that is not used by CBSD(s) comprising node(s), with edge(s) with the new CBSD, of the connected set(s) and not a frequency spectrum, or portion thereof, that would result in interference power at any protection point(s) (whose neighborhood(s) encompass the geographic location of the new CBSD) having a level equal to or greater than the value of a corresponding protection point's determined interference margin.

If there is available frequency spectrum of connected set(s), then in block 500G-6, a new color is assigned to the new CBSD. New color means a color not used in a connected set having a node with an edge with the new CBSD, or alternatively is a color not used in the network graph. A set of colors, set J, consists of the colors assigned to nodes having node(s) with edge(s) with the new CBSD and the color assigned to the new CBSD.

In block 500G-7, at least a portion (i.e., all or a part of) of a contiguous portion of the available frequency spectrum of connected set(s) is assigned to the new color assigned to the new CBSD. Thus, the at least a portion (i.e., all or a part of) of a contiguous portion of the available frequency spectrum is assigned to the new CBSD. If there are multiple available frequency spectrum, or portion(s) thereof, of connected set(s), then the available frequency spectrum, or a portion thereof, with the greatest difference between the interference margin and interference power level from new CBSD is selected. After performing block 500G-7, proceed to block 500G-11.

If there is no available frequency spectrum of connected set(s), then in block 500G-8, a node of a connected set with which the new CBSD interferes the least is determined. If edge weights are used to characterize the interference levels at each edge, then the node would be the node having an edge with the new CBSD that has the lowest edge weight.

In block 500G-9, the frequency spectrum, or a portion thereof, of the determined node having the least interference with the new CBSD is assigned to the new CBSD. Optionally, the frequency spectrum, or portion thereof, is determined by identifying a frequency spectrum assigned to a color of the node determined in block 500G-8.

In block 500G-10, a transmit power level of the new CBSD is determined that eliminates the edge between the new CBSD and the determined node. The determined transmit power is ascertained by iteratively reducing the transmit power level of the new CBSD from the maximum transmit power of the new CBSD until interference is reduced so that no edge is formed with the determined node, e.g., using techniques described elsewhere herein, while enhancing, e.g., optimizing, the transmit power of the new CBSD.

In block 500G-11, whether interference from the new CBSD at any protection point(s) (associated with the frequency spectrum assigned (or allocated to the color assigned) to the new CBSD and whose neighborhood(s) encompass the geographic location of the new CBSD) is greater than any of the interference margin(s) of the protection point(s). Block 500G-11 may be implemented as described with respect to block 400H-7.

In block 500G-12, the transmit power of the new CBSD is reduced so that interference at any of the protection point(s) is not greater than any interference margin of the protection points. Block 500G-12 may be implemented as described with respect to block 400H-8. If block 500G-12 is proceeded indirectly by block 500G-7, the reduction of transmit power is from either the maximum transmit power that the new CBSD is capable of or a transmit power requested by the new CBSD.

The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

Databases as used herein may be either conventional databases or data storage formats of any type, e.g., data files. Although separate databases are recited herein, one or more of such databases may be combined.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A program product comprising a non-transitory processor readable medium on which program instructions are embodied, wherein the program instructions are configured, when executed by at least one programmable processor, to cause the at least one programmable processor to:
   receive co-existence data and information about a new radio configured to transmit in shared frequency spectra, wherein the co-existence data includes data about a network graph comprising at least one connected set, wherein each connected set comprises at least one node and each node comprises at least one other radio; and
   determine a frequency spectrum and a maximum transmit power that can be allocated to the new radio prior to execution of planned spectrum coordination analysis and based upon whether the new radio forms an edge with at least one node of at least one connected set, wherein each edge occurs when a criterion of interference at either the new radio due to at least one radio of which the at least one node comprises, or the at least one node due to the new radio, exceeds a corresponding threshold level;
   wherein determine the frequency spectrum and the maximum transmit power that can be allocated to the new radio prior to the execution of planned spectrum coordination comprises one of:
      (i) determine if the new radio forms an edge with at least one node of a connected set, wherein the edge between the new radio and the at least one node of the connected set is a criterion of interference at the new radio or at a node that exceeds a second threshold level of interference;
      determine that the new radio forms the edge with at least one node of a connected set, then determine if the new radio forms another edge with only one connected set; and
      determine that the new radio forms the other edge with only one connected set, then determine a frequency spectrum, in the shared frequency spectra, and a maximum transmit power which can be provided to the new radio when diminishing interference to (a) at least one other radio comprising at least one node of a connected set which with the new radio forms the other edge and (b) at least one protection point each of which is associated with another frequency spectrum that includes all or part of the determined frequency spectrum and each of which has a neighborhood encompassing a geographic location of the new radio, wherein associated with another frequency spectrum is frequency spectrum that must be free of interference at a geographic location of a protection point;
      (ii) determine if the new radio forms the edge with at least one node of a connected set, wherein the edge between the new radio and the at least one node of the connected set is a criterion of interference at the new radio or at a node that exceeds a second threshold level of interference;
      determine that the new radio forms the edge with at least one node of a connected set, then determine if the new radio forms the other edge with only one connected set; and
      determine that the new radio forms the other edge with more than one connected set, then determine a frequency spectrum, in the shared frequency spectra, and a maximum transmit power which can be granted to the new radio when diminishing interference at (a) at least one other radio comprising at least one node of at least one connected set, wherein the new radio forms an edge with at least one node of each of the at least one connected set, and (b) at least one protection point each of which is associated with another frequency spectrum that includes all or part of the determined frequency spectrum and each of which has a neighborhood encompassing a geographic location of the new radio;
      (iii) determine if the new radio forms the edge with at least one node of a connected set, wherein the edge between the new radio and the at least one node of the connected set is a criterion of interference at the new radio or at a node that exceeds a second threshold level of interference; and
      determine that the new radio does not form the edge with at least one node of a connected set, then:
         allocate a color to the new radio;
         determine if protection point interference free spectrum is available, wherein protection point interference free frequency spectrum is frequency spectrum in the shared frequency spectra which does not overlap, in whole or in part, frequency spectrum associated with a protection point in whose neighborhood the new radio is geographically located, wherein frequency spectrum associated with a protection point is frequency spectrum that must be free of interference at a geographic location of the protection point; and
         determine that the protection point interference free spectrum is available, then determine a frequency spectrum, in the shared frequency spectra, and a maximum transmit power, where the determined frequency spectrum consists of all or a portion of a protection point interference free frequency spectrum; and (iv) determine if the new radio forms the edge with at least one node of a connected set, wherein the edge between the new radio and the at least one node of the connected set is a criterion of interference at the new radio or at a node that exceeds a second threshold level of interference; and determine that the new radio does not form the edge with at least one node of a connected set, then:

allocate a color to the new radio;

determine if protection point interference free spectrum is available, wherein protection point interference free frequency spectrum is frequency spectrum in the shared frequency spectra which does not overlap, in whole or in part, frequency spectrum associated with a protection point in whose neighborhood the new radio is geographically located, wherein frequency spectrum associated with a protection point is frequency spectrum that must be free of interference at a geographic location of the protection point; and determine that the protection point interference free spectrum is unavailable, then determine a frequency spectrum, in the shared frequency spectra, and a maximum transmit power, where the determined frequency spectrum consists of all or a portion of a frequency spectrum associated with a protection point, whose neighborhood encompasses the geographic location of the new radio, that has a largest value of a difference determined by when interference, from the new radio, at the protection point is subtracted from an interference margin for the protection point, wherein the interference margin for a protection point is a sum of at least a head room margin for the protection point and an unused interference margin of the frequency spectrum.

2. The program product of claim 1, wherein the co-existence data further comprises data about at least one protection point whose neighborhood encompasses a geographic location of the new radio.

3. The program product of claim 1, wherein each of the new radio and the at least one other radio are a citizens broadband radio service device.

4. The program product of claim 1, wherein the program instructions are configured, when executed by the at least one programmable processor, to further cause the at least one programmable processor to:

receive a frequency spectrum inquiry or a grant request from the new radio about frequency spectrum inquired about by or requested by the new radio;

determine if the inquired about or requested frequency spectrum consists of all or a portion of the determined frequency spectrum;

determine that the inquired about or requested frequency spectrum consists of all or a portion of the determined frequency spectrum, then determine a minimum of the inquired about or requested frequency spectrum and the determined frequency spectrum; and send the determined minimum frequency spectrum and a determined transmit power to the new radio which is configured to then transmit in the determined minimum frequency spectrum with a transmit power equal to or less than the determined transmit power.

5. The program product of claim 1, wherein when the protection point interference free spectrum is determined available, then the determined maximum transmit power is a maximum transmit power of the new radio at which the new radio is capable of transmitting.

6. The program product of claim 1, wherein upon determining that the protection point interference free spectrum is available, then the determined frequency spectrum consists of a largest contiguous bandwidth of frequency spectrum of the protection point interference free frequency spectrum and the determined maximum transmit power is a maximum transmit power of the new radio at which the new radio is capable of transmitting.

7. The program product of claim 1, wherein determine the frequency spectrum, in the shared frequency spectra, and maximum transmit power which can be granted to the new radio when diminishing interference to (a) at least one other radio comprising at least one node of at least one connected set each of which with the new radio forms an edge and (b) at least one protection point each of which is associated with another frequency spectrum that includes all or part of the determined frequency spectrum and each of which has a neighborhood encompassing a geographic location of the new radio comprises:

determine whether a chromatic number of the network graph increases if the new radio is added as a node to the network graph;

determine that the chromatic number increases with an addition of the new radio to the network graph, then determine if there is available frequency spectrum of one connected set, wherein available frequency spectrum, of a connected set, is a frequency spectrum that is not assigned to at least one color each of which is assigned to at least one node, that has an edge with the new radio, of the connected set and is not a frequency spectrum, or portion thereof, that would result in interference level at a protection point, whose neighborhood encompass the geographic location of the new radio, having a level equal to or greater than an interference margin of the protection point, wherein the interference margin for a protection point is a sum of at least a head room margin for the protection point and an unused interference margin of the frequency spectrum;

determine that there is the available frequency spectrum, then:

assign a new color to a node comprising the new radio, where the new color is a color that is not assigned to a node of the connected set; and assign at least a portion of the available frequency spectrum to the new color, wherein the new radio is assigned the at least a portion of the available frequency spectrum; and determine that there is not the available frequency spectrum, then:

determine a node of the connected set with which the new radio interferes a least amount;

determine a color of the determined node and assign the frequency spectrum allocated to the determined color to the new radio;

determine a transmit power of the new radio so that the edge is eliminated between the new radio and the determined node; and determine whether interference from the new radio, at a protection point associated with the frequency spectrum assigned to the new radio and whose neighborhood encompasses the geographic location of the new radio, is greater than the interference margin of the protection point; and determine that the interference from the new radio is greater than the interference margin of the protection point, then reduce a transmit power of the new radio so that interference from the new radio at each protection point, whose neighborhood encompassing the geographic location of the new radio, is not greater than an interference margin of a corresponding protection point.

8. The program product of claim 1, wherein determine the frequency spectrum, in the shared frequency spectra, and maximum transmit power which can be granted to the new radio when diminishing interference to (a) at least one other radio comprising at least one node of at least one connected set each of which with the new radio forms an edge and (b) at least one protection point each of which is associated with another frequency spectrum that includes all or part of the determined frequency spectrum and each of which has a neighborhood encompassing a geographic location of the new radio comprises:

determine whether a chromatic number of the network graph increases if the new radio is added as a node to the network graph;

determine that the chromatic number does not increase with an addition of the new radio to the network graph, then determine a color of each node, in the connected set, comprising at least one other radio not interfered with by the new radio;

determine if a number of determined colors is greater than one; and determine that the number of determined colors is greater than one, then:

select a color from colors assigned nodes in the network graph having no edges; and determine a frequency spectrum of the selected color;

determine that the number of determined colors equals one, then determine frequency spectrum of one color;

assign the determined frequency spectrum to the new radio; and reduce a transmit power of the new radio so that interference from the new radio at each protection point, whose neighborhood encompassing the geographic location of the new radio, is not greater than an interference margin of a corresponding protection point, wherein the interference margin for a protection point is a sum of at least a head room margin for the protection point and an unused interference margin of the frequency spectrum.

9. The program product of claim 1, wherein determine the frequency spectrum, in the shared frequency spectra, and the maximum transmit power which can be granted to the new radio when diminishing interference to (a) at least one other radio comprising at least one node of at least one connected set each of which with the new radio forms an edge and (b) at least one protection point each of which is associated with another frequency spectrum that includes all or part of the determined frequency spectrum and each of which has a neighborhood encompassing a geographic location of the new radio comprises:

determine a cardinal value of a set of each frequency spectrum allocated to a color assigned to each of the at least one node having an edge with the new radio;

determine a maximum of a chromatic number of each connected set comprising at least one node having an edge with the new radio;

determine whether the cardinal value of the set is less than the maximum of the chromatic number of each connected set; and determine that the cardinal value of the set is less than the maximum of the chromatic number of each connected set, then a frequency spectrum is selected for the new radio that is different than the frequency spectrum assigned allocated to each color assigned to each of the at least one node with which the new radio has an edge.

10. The program product of claim 1, wherein determine the frequency spectrum, in the shared frequency spectra, and the maximum transmit power which can be granted to the new radio when diminishing interference to (a) at least one other radio comprising at least one node of at least one connected set each of which with the new radio forms an edge and (b) at least one protection point each of which is associated with another frequency spectrum that includes all or part of the determined frequency spectrum and each of which has a neighborhood encompassing a geographic location of the new radio comprises:

determine a cardinal value of a set of each frequency spectrum allocated to a color assigned to each of the at least one node having an edge with the new radio;

determine a maximum of a chromatic number of each connected set comprising at least one node having an edge with the new radio;

determine whether the cardinal value of the set is less than the maximum of the chromatic number of each connected set;

determine that the cardinal value of the set is not less than the maximum of the chromatic number of each connected set having an edge with by the new radio, then determine whether there is available frequency spectrum of at least one connected set comprising at least one node with at least one edge with the new radio, wherein the available frequency spectrum of a connected set means frequency spectrum that is not used by at least one other radio comprising each node, of the connected set, with an with the new radio and not a frequency spectrum, or portion thereof, that would result in interference at a protection point, whose neighborhood encompass a geographic location of the new radio, having a level equal to or greater than an interference margin of the protection point, wherein the interference margin for a protection point is a sum of at least a head room margin for the protection point and an unused interference margin of the frequency spectrum; and determine that there is available frequency spectrum, then:

assign a new color to the new radio, wherein a new color is a color not used in a connected set having a node with an edge with the new radio or a color not used in the network graph; and assign at least a portion of a contiguous portion of the available frequency spectrum to the new color;

determine that there is no available frequency spectrum, then:

determine a node of the connected set having an edge with the new radio and with which the new radio interferes the least;

assign the frequency spectrum, or a portion thereof, allocated to the color of the determined node to the new radio; and determine a transmit power of the new radio by reducing the transmit power to eliminate the edge between the new radio and the determined node;

determine whether interference from the new radio at a protection point associated with the frequency spectrum assigned to the new radio and allocated to the new color assigned to the new radio is greater than the interference margin of the protection point, wherein the neighborhood of the protection point encompasses the geographic location of the new radio; and determine that the interference from the new radio at the protection point associated with the frequency spectrum is greater than the interference margin of the protection point, then reduce the transmit power of the new radio so that interference at the protection point is not greater than any interference margin of the protection point.

11. The program product of claim 1, wherein the program instructions are configured, when executed by the at least one programmable processor, to further cause the at least one programmable processor to:

determine if a pre-existing node of the network graph comprises the new radio; and determine that a pre-existing node comprises the new radio, then:

identify each edge created between a pair of nodes consisting of the pre-existing node and another node of the network graph;
  determine whether there is at least one identified edge;
  determine that there are no edges identified, then determine a frequency spectrum and a maximum transmit power for the new radio;
  determine that at least one edge is identified, then determine, for each identified edge, whether both nodes, of at least one pair of nodes, are allocated a same frequency spectrum or a portion thereof; and
  for each identified edge, determine that both nodes of the pair of nodes are not allocated the same frequency spectrum or a portion thereof, then determine a frequency spectrum and a maximum transmit power for the new radio.

12. A method for providing a radio prompt access to shared spectrum, the method comprising:

receiving co-existence data and information about a new radio configured to transmit in shared frequency spectra, wherein the co-existence data includes data about a network graph comprising at least one connected set, wherein each connected set comprises at least one node and each node comprises at least one other radio; and determining a frequency spectrum and a maximum transmit power that can be allocated to the new radio prior to execution of planned spectrum coordination analysis and based upon whether the new radio forms an edge with at least one node of at least one connected set, wherein each edge occurs when a criterion of interference at either the new radio due to at least one radio of which the at least one node comprises, or the at least one node due to the new radio, exceeds a corresponding threshold level;

wherein determining the frequency spectrum and the maximum transmit power that can be allocated to the new radio prior to the execution of planned spectrum coordination comprises one of:

(i) determining if the new radio forms an edge with at least one node of a connected set, wherein the edge between the new radio and the at least one node of the connected set is a criterion of interference at the new radio or at a node that exceeds a second threshold level of interference;

determining that the new radio forms the edge with at least one node of a connected set, then determining if the new radio forms another edge with only one connected set; and determining that the new radio forms the other edge with only one connected set, then determining a frequency spectrum, in the shared frequency spectra, and a maximum transmit power which can be provided to the new radio when diminishing interference to (a) at least one other radio comprising at least one node of a connected set which with the new radio forms the other edge and (b) at least one protection point each of which is associated with another frequency spectrum that includes all or part of the determined frequency spectrum and each of which has a neighborhood encompassing a geographic location of the new radio, wherein associated with another frequency spectrum is frequency spectrum that must be free of interference at a geographic location of a protection point;

(ii) determining if the new radio forms the edge with at least one node of a connected set, wherein the edge between the new radio and the at least one node of the connected set is a criterion of interference at the new radio or at a node that exceeds a second threshold level of interference;

determining that the new radio forms the edge with at least one node of a connected set, then determining if the new radio forms the other edge with only one connected set; and determining that the new radio forms the other edge with more than one connected set, then determining a frequency spectrum, in the shared frequency spectra, and a maximum transmit power which can be granted to the new radio when diminishing interference at (a) at least one other radio comprising at least one node of at least one connected set, wherein the new radio forms an edge with at least one node of each of the at least one connected set, and (b) at least one protection point each of which is associated with another frequency spectrum that includes all or part of the determined frequency spectrum and each of which has a neighborhood encompassing a geographic location of the new radio;

(iii) determining if the new radio forms the edge with at least one node of a connected set, wherein the edge between the new radio and the at least one node of the connected set is a criterion of interference at the new radio or at a node that exceeds a second threshold level of interference; and determining that the new radio does not form the edge with at least one node of a connected set, then:

allocating a color to the new radio;

determining if protection point interference free spectrum is available, wherein protection point interference free frequency spectrum is frequency spectrum in the shared frequency spectra which does not overlap, in whole or in part, frequency spectrum associated with a protection point in whose neighborhood the new radio is geographically located, wherein frequency spectrum associated with a protection point is frequency spectrum that must be free of interference at a geographic location of the protection point; and determining that the protection point interference free spectrum is available, then determining a frequency spectrum, in the shared frequency spectra, and a maximum transmit power, where the determined frequency spectrum consists of all or a portion of a protection point interference free frequency spectrum; and (iv) determining if the new radio forms the edge with at least one node of a connected set, wherein the edge between the new radio and the at least one node of the connected set is a criterion of interference at the new radio or at a node that exceeds a second threshold level of interference; and determining that the new radio does not form the edge with at least one node of a connected set, then:
allocating a color to the new radio;
determining if protection point interference free spectrum is available, wherein protection point interference free frequency spectrum is frequency spectrum in the shared frequency spectra which does not overlap, in whole or in part, frequency spectrum associated with a protection point in whose neighborhood the new radio is geographically located, wherein frequency spectrum associated with a protection point is frequency spectrum that must be free of interference at a geographic location of the protection point; and
determining that the protection point interference free spectrum is unavailable, then determining a frequency spectrum, in the shared frequency spectra, and a maximum transmit power, where the determined frequency spectrum consists of all or a portion of a frequency spectrum associated with a protection point, whose neighborhood encompasses the geographic location of the new radio, that has a largest value of a difference determined by when interference, from the new radio, at the protection point is subtracted from an interference margin for the protection point, wherein the interference margin for a protection point is a sum of at least a head room margin for the protection point and an unused interference margin of the frequency spectrum.

13. The method of claim 12, wherein the co-existence data further comprises data about at least one protection point whose neighborhood encompasses a geographic location of the new radio.

14. The method of claim 12, wherein each of the new radio and the at least one other radio are a citizens broadband radio service device.

15. The method of claim 12, further comprising:
receiving a frequency spectrum inquiry or a grant request from the new radio about frequency spectrum inquired about by or requested by the new radio;
determining if the inquired about or requested frequency spectrum consists of all or a portion of the determined frequency spectrum;
determining that the inquired about or requested frequency spectrum consists of all or a portion of the determined frequency spectrum, then determining a minimum of the inquired about or requested frequency spectrum and the determined frequency spectrum; and
sending the determined minimum frequency spectrum and a determined transmit power to the new radio which is configured to then transmit in the determined minimum frequency spectrum with a transmit power equal to or less than the determined transmit power.

16. The method of claim 12, wherein when the protection point interference free spectrum is determined available, then the determined maximum transmit power is a maximum transmit power of the new radio at which the new radio is capable of transmitting.

17. The method of claim 12, wherein upon determining that the protection point interference free spectrum is available, then the determined frequency spectrum consists of a largest contiguous bandwidth of frequency spectrum of the protection point interference free frequency spectrum and the determined maximum transmit power is a maximum transmit power of the new radio at which the new radio is capable of transmitting.

18. The method of claim 12, wherein determining the frequency spectrum, in the shared frequency spectra, and maximum transmit power which can be granted to the new radio when diminishing interference to (a) at least one other radio comprising at least one node of at least one connected set each of which with the new radio forms an edge and (b) at least one protection point each of which is associated with another frequency spectrum that includes all or part of the determined frequency spectrum and each of which has a neighborhood encompassing a geographic location of the new radio comprises:
determining whether a chromatic number of the network graph increases if the new radio is added as a node to the network graph;
determining that the chromatic number increases with an addition of the new radio to the network graph, then determine if there is available frequency spectrum of one connected set, wherein available frequency spectrum, of a connected set, is a frequency spectrum that is not assigned to at least one color each of which is assigned to at least one node, that has an edge with the new radio, of the connected set and is not a frequency spectrum, or portion thereof, that would result in interference level at a protection point, whose neighborhood encompass the geographic location of the new radio, having a level equal to or greater than an interference margin of the protection point, wherein the interference margin for a protection point is a sum of at least a head room margin for the protection point and an unused interference margin of the frequency spectrum;
determining that there is the available frequency spectrum, then:
assigning a new color to a node comprising the new radio, where the new color is a color that is not assigned to a node of the connected set; and
assigning at least a portion of the available frequency spectrum to the new color, wherein the new radio is assigned the at least a portion of the available frequency spectrum; and
determining that there is not the available frequency spectrum, then:
determining a node of the connected set with which the new radio interferes a least amount;
determining a color of the determined node and assign the frequency spectrum allocated to the determined color to the new radio;
determine a transmit power of the new radio so that the edge is eliminated between the new radio and the determined node; and
determining whether interference from the new radio, at a protection point associated with the frequency spectrum assigned to the new radio and whose neighborhood encompasses the geographic location of the new radio, is greater than the interference margin of the protection point; and determining that the interference from the new radio is greater than the interference margin of the protection point, then reduce a transmit power of the new radio so that interference from the new radio at each protection point, whose neighborhood encompassing the geographic location of the new radio, is not greater than an interference margin of a corresponding protection point.

19. The method of claim 12, wherein determining the frequency spectrum, in the shared frequency spectra, and maximum transmit power which can be granted to the new radio when diminishing interference to (a) at least one other radio comprising at least one node of at least one connected set each of which with the new radio forms an edge and (b) at least one protection point each of which is associated with another frequency spectrum that includes all or part of the determined frequency spectrum and each of which has a neighborhood encompassing a geographic location of the new radio comprises:
   determining whether a chromatic number of the network graph increases if the new radio is added as a node to the network graph;
   determining that the chromatic number does not increase with an addition of the new radio to the network graph, then determine a color of each node, in the connected set, comprising at least one other radio not interfered with by the new radio;
   determining if a number of determined colors is greater than one; and
      determining that the number of determined colors is greater than one, then:
         selecting a color from colors assigned nodes in the network graph having no edges; and
         determining a frequency spectrum of the selected color;
      determining that the number of determined colors equals one, then determining frequency spectrum of one color;
   assigning the determined frequency spectrum to the new radio; and
   reducing a transmit power of the new radio so that interference from the new radio at each protection point, whose neighborhood encompassing the geographic location of the new radio, is not greater than an interference margin of a corresponding protection point, wherein the interference margin for a protection point is a sum of at least a head room margin for the protection point and an unused interference margin of the frequency spectrum.

20. The method of claim 12, wherein determining the frequency spectrum, in the shared frequency spectra, and the maximum transmit power which can be granted to the new radio when diminishing interference to (a) at least one other radio comprising at least one node of at least one connected set each of which with the new radio forms an edge and (b) at least one protection point each of which is associated with another frequency spectrum that includes all or part of the determined frequency spectrum and each of which has a neighborhood encompassing a geographic location of the new radio comprises:
   determining a cardinal value of a set of each frequency spectrum allocated to a color assigned to each of the at least one node having the edge with the new radio;
   determining a maximum of a chromatic number of each connected set comprising at least one node having an edge with the new radio;
   determining whether the cardinal value of the set is less than the maximum of the chromatic number of each connected set; and
   determining that the cardinal value of the set is less than the maximum of the chromatic number of each connected set, then a frequency spectrum is selected for the new radio that is different than the frequency spectrum assigned allocated to each color assigned to each of the at least one node with which the new radio has an edge.

21. The method of claim 12, wherein determining the frequency spectrum, in the shared frequency spectra, and the maximum transmit power which can be granted to the new radio when diminishing interference to (a) at least one other radio comprising at least one node of at least one connected set each of which with the new radio forms an edge and (b) at least one protection point each of which is associated with another frequency spectrum that includes all or part of the determined frequency spectrum and each of which has a neighborhood encompassing a geographic location of the new radio comprises:
   determining a cardinal value of a set of each frequency spectrum allocated to a color assigned to each of the at least one node having an edge with the new radio;
   determining a maximum of a chromatic number of each connected set comprising at least one node having an edge with the new radio;
   determining whether the cardinal value of the set is less than the maximum of the chromatic number of each connected set;
   determining that the cardinal value of the set is not less than the maximum of the chromatic number of each connected set having an edge with by the new radio, then determine whether there is available frequency spectrum of at least one connected set comprising at least one node with at least one edge with the new radio, wherein the available frequency spectrum of a connected set means frequency spectrum that is not used by at least one other radio comprising each node, of the connected set, with an with the new radio and not a frequency spectrum, or portion thereof, that would result in interference at a protection point, whose neighborhood encompass a geographic location of the new radio, having a level equal to or greater than an interference margin of the protection point, wherein the interference margin for a protection point is a sum of at least a head room margin for the protection point and an unused interference margin of the frequency spectrum; and
   determining that there is available frequency spectrum, then:
      assigning a new color to the new radio, wherein a new color is a color not used in a connected set having a node with an edge with the new radio or a color not used in the network graph; and
      assigning at least a portion of a contiguous portion of the available frequency spectrum to the new color;
   determine that there is no available frequency spectrum, then:
      determining a node of the connected set having an edge with the new radio and with which the new radio interferes the least;
      assigning the frequency spectrum, or a portion thereof, allocated to the color of the determined node to the new radio; and
      determining a transmit power of the new radio by reducing the transmit power to eliminate the edge between the new radio and the determined node;

determining whether interference from the new radio at a protection point associated with the frequency spectrum assigned to the new radio and allocated to the new color assigned to the new radio is greater than the interference margin of the protection point, wherein the neighborhood of the protection point encompasses the geographic location of the new radio; and determining that the interference from the new radio at the protection point associated with the frequency spectrum is greater than the interference margin of the protection point, then reduce the transmit power of the new radio so that interference at the protection point is not greater than any interference margin of the protection point.

22. The method of claim 12, further comprising:

determining if a pre-existing node of the network graph comprises the new radio; and determining that a pre-existing node comprises the new radio, then:
  identifying each edge created between a pair of nodes consisting of the pre-existing node and another node of the network graph;
  determining whether there is at least one identified edge;
  determining that there are no edges identified, then determining a frequency spectrum and a maximum transmit power for the new radio;
  determining that at least one edge is identified, then determining, for each identified edge, whether both nodes, of at least one pair of nodes, are allocated a same frequency spectrum or a portion thereof; and
  for each identified edge, determining that both nodes of the pair of nodes are not allocated the same frequency spectrum or a portion thereof, then determining a frequency spectrum and a maximum transmit power for the new radio.

23. A system for providing a radio prompt access to shared spectrum, the system comprising:

processing circuitry comprising processor circuitry coupled to memory circuitry and configured to:
  receive co-existence data and information about a new radio configured to transmit in shared frequency spectra, wherein the co-existence data includes data about a network graph comprising at least one connected set, wherein each connected set comprises at least one node and each node comprises at least one other radio; and
  determine a frequency spectrum and a maximum transmit power that can be allocated to the new radio prior to execution of planned spectrum coordination analysis and based upon whether the new radio forms an edge with at least one node of at least one connected set, wherein each edge occurs when a criterion of interference at either the new radio due to at least one radio of which the at least one node comprises, or the at least one node due to the new radio, exceeds a corresponding threshold level;
  wherein determining the frequency spectrum and the maximum transmit power that can be allocated to the new radio prior to the execution of planned spectrum coordination comprises one of:
    (i) determine if the new radio forms an edge with at least one node of a connected set, wherein an edge is a criterion of interference at the new radio or at a node that exceeds a second threshold level of interference;
    determine that the new radio forms the edge with at least one node of a connected set, then determine if the new radio forms another edge with only one connected set; and
    determine that the new radio forms the other edge with only one connected set, then determine a frequency spectrum, in the shared frequency spectra, and a maximum transmit power which can be provided to the new radio when diminishing interference to (a) at least one other radio comprising at least one node of a connected set which with the new radio forms the other edge and (b) at least one protection point each of which is associated with another frequency spectrum that includes all or part of the determined frequency spectrum and each of which has a neighborhood encompassing a geographic location of the new radio, wherein associated with another frequency spectrum is frequency spectrum that must be free of interference at a geographic location of a protection point;
    (ii) determine if the new radio forms the edge with at least one node of a connected set, wherein the edge between the new radio and the at least one node of the connected set is a criterion of interference at the new radio or at a node that exceeds a second threshold level of interference;
    determine that the new radio forms the edge with at least one node of a connected set, then determine if the new radio forms the other edge with only one connected set; and
    determine that the new radio forms the other edge with more than one connected set, then determine a frequency spectrum, in the shared frequency spectra, and a maximum transmit power which can be granted to the new radio when diminishing interference at (a) at least one other radio comprising at least one node of at least one connected set, wherein the new radio forms an edge with at least one node of each of the at least one connected set, and (b) at least one protection point each of which is associated with another frequency spectrum that includes all or part of the determined frequency spectrum and each of which has a neighborhood encompassing a geographic location of the new radio;
    (iii) determine if the new radio forms the edge with at least one node of a connected set, wherein the edge between the new radio and the at least one node of the connected set is a criterion of interference at the new radio or at a node that exceeds a second threshold level of interference; and
    determine that the new radio does not form the edge with at least one node of a connected set, then:
      allocate a color to the new radio;
      determine if protection point interference free spectrum is available, wherein protection point interference free frequency spectrum is frequency spectrum in the shared frequency spectra which does not overlap, in whole or in part, frequency spectrum associated with a protection point in whose neighborhood the new radio is geographically located, wherein frequency spectrum associated with a protection point is frequency spectrum that must be free of interference at a geographic location of the protection point; and determine that the protection point interference free spectrum is available, then determine a frequency spectrum, in the shared frequency spectra, and a maximum transmit power, where the determined frequency spectrum consists of all or a portion of a protection point interference free frequency spectrum; and (iv) determine if the new radio forms the edge with at least one node of a connected set, wherein the edge between the new radio and the at least one node of the connected set is a criterion of interference at the new radio or at a node that exceeds a second threshold level of interference; and determine that the new radio does not form the edge with at least one node of a connected set, then:

allocate a color to the new radio;

determine if protection point interference free spectrum is available, wherein protection point interference free frequency spectrum is frequency spectrum in the shared frequency spectra which does not overlap, in whole or in part, frequency spectrum associated with a protection point in whose neighborhood the new radio is geographically located, wherein frequency spectrum associated with a protection point is frequency spectrum that must be free of interference at a geographic location of the protection point; and determine that the protection point interference free spectrum is unavailable, then determine a frequency spectrum, in the shared frequency spectra, and a maximum transmit power, where the determined frequency spectrum consists of all or a portion of a frequency spectrum associated with a protection point, whose neighborhood encompasses the geographic location of the new radio, that has a largest value of a difference determined by when interference, from the new radio, at the protection point is subtracted from an interference margin for the protection point, wherein the interference margin for a protection point is a sum of at least a head room margin for the protection point and an unused interference margin of the frequency spectrum.

24. The system of claim 23, wherein the co-existence data further comprises data about at least one protection point whose neighborhood encompasses a geographic location of the new radio.

25. The system of claim 23, wherein each of the new radio and the at least one other radio are a citizens broadband radio service device.

26. The system of claim 23, wherein the processing circuitry is further configured to:

receive a frequency spectrum inquiry or a grant request from the new radio about frequency spectrum inquired about by or requested by the new radio;

determine if the inquired about or requested frequency spectrum consists of all or a portion of the determined frequency spectrum;

determine that the inquired about or requested frequency spectrum consists of all or a portion of the determined frequency spectrum, then determine a minimum of the inquired about or requested frequency spectrum and the determined frequency spectrum; and send the determined minimum frequency spectrum and a determined transmit power to the new radio which is configured to then transmit in the determined minimum frequency spectrum with a transmit power equal to or less than the determined transmit power.

27. The system of claim 23, wherein when the protection point interference free spectrum is determined available, then the determined maximum transmit power is a maximum transmit power of the new radio at which the new radio is capable of transmitting.

28. The system of claim 23, wherein upon determining that the protection point interference free spectrum is available, then the determined frequency spectrum consists of a largest contiguous bandwidth of frequency spectrum of the protection point interference free frequency spectrum and the determined maximum transmit power is a maximum transmit power of the new radio at which the new radio is capable of transmitting.

29. The system of claim 23, wherein determine the frequency spectrum, in the shared frequency spectra, and maximum transmit power which can be granted to the new radio when diminishing interference to (a) at least one other radio comprising at least one node of at least one connected set each of which with the new radio forms an edge and (b) at least one protection point each of which is associated with another frequency spectrum that includes all or part of the determined frequency spectrum and each of which has a neighborhood encompassing a geographic location of the new radio comprises:

determine whether a chromatic number of the network graph increases if the new radio is added as a node to the network graph;

determine that the chromatic number increases with an addition of the new radio to the network graph, then determine if there is available frequency spectrum of one connected set, wherein available frequency spectrum, of a connected set, is a frequency spectrum that is not assigned to at least one color each of which is assigned to at least one node, that has an edge with the new radio, of the connected set and is not a frequency spectrum, or portion thereof, that would result in interference level at a protection point, whose neighborhood encompass the geographic location of the new radio, having a level equal to or greater than an interference margin of the protection point, wherein the interference margin for a protection point is a sum of at least a head room margin for the protection point and an unused interference margin of the frequency spectrum;

determine that there is the available frequency spectrum, then:

assign a new color to a node comprising the new radio, where the new color is a color that is not assigned to a node of the connected set; and assign at least a portion of the available frequency spectrum to the new color, wherein the new radio is assigned the at least a portion of the available frequency spectrum; and determine that there is not the available frequency spectrum, then:

determine a node of the connected set with which the new radio interferes a least amount;

determine a color of the determined node and assign the frequency spectrum allocated to the determined color to the new radio;

determine a transmit power of the new radio so that the edge is eliminated between the new radio and the determined node; and determine whether interference from the new radio, at a protection point associated with the frequency spectrum assigned to the new radio and whose neighborhood encompasses the geographic location of the new radio, is greater than the interference margin of the protection point; and determine that the interference from the new radio is greater than the interference margin of the protection point, then reduce a transmit power of the new radio so that interference from the new radio at each protection point, whose neighborhood encompassing the geographic location of the new radio, is not greater than an interference margin of a corresponding protection point.

30. The system of claim 23, wherein determine the frequency spectrum, in the shared frequency spectra, and maximum transmit power which can be granted to the new radio when diminishing interference to (a) at least one other radio comprising at least one node of at least one connected set each of which with the new radio forms an edge and (b) at least one protection point each of which is associated with another frequency spectrum that includes all or part of the determined frequency spectrum and each of which has a neighborhood encompassing a geographic location of the new radio comprises:

determine whether a chromatic number of the network graph increases if the new radio is added as a node to the network graph;

determine that the chromatic number does not increase with an addition of the new radio to the network graph, then determine a color of each node, in the connected set, comprising at least one other radio not interfered with by the new radio;

determine if a number of determined colors is greater than one; and determine that the number of determined colors is greater than one, then:

select a color from colors assigned nodes in the network graph having no edges; and determine a frequency spectrum of the selected color;

determine that the number of determined colors equals one, then determine frequency spectrum of one color;

assign the determined frequency spectrum to the new radio; and reduce a transmit power of the new radio so that interference from the new radio at each protection point, whose neighborhood encompassing the geographic location of the new radio, is not greater than an interference margin of a corresponding protection point, wherein the interference margin for a protection point is a sum of at least a head room margin for the protection point and an unused interference margin of the frequency spectrum.

31. The system of claim 23, wherein determine the frequency spectrum, in the shared frequency spectra, and the maximum transmit power which can be granted to the new radio when diminishing interference to (a) at least one other radio comprising at least one node of at least one connected set each of which with the new radio forms an edge and (b) at least one protection point each of which is associated with another frequency spectrum that includes all or part of the determined frequency spectrum and each of which has a neighborhood encompassing a geographic location of the new radio comprises:

determine a cardinal value of a set of each frequency spectrum allocated to a color assigned to each of the at least one node having an edge with the new radio;

determine a maximum of a chromatic number of each connected set comprising at least one node having an edge with the new radio;

determine whether the cardinal value of the set is less than the maximum of the chromatic number of each connected set; and determine that the cardinal value of the set is less than the maximum of the chromatic number of each connected set, then a frequency spectrum is selected for the new radio that is different than the frequency spectrum assigned allocated to each color assigned to each of the at least one node with which the new radio has an edge.

32. The system of claim 23, wherein determine the frequency spectrum, in the shared frequency spectra, and the maximum transmit power which can be granted to the new radio when diminishing interference to (a) at least one other radio comprising at least one node of at least one connected set each of which with the new radio forms an edge and (b) at least one protection point each of which is associated with another frequency spectrum that includes all or part of the determined frequency spectrum and each of which has a neighborhood encompassing a geographic location of the new radio comprises:

determine a cardinal value of a set of each frequency spectrum allocated to a color assigned to each of the at least one node having an edge with the new radio;

determine a maximum of a chromatic number of each connected set comprising at least one node having an edge with the new radio;

determine whether the cardinal value of the set is less than the maximum of the chromatic number of each connected set;

determine that the cardinal value of the set is not less than the maximum of the chromatic number of each connected set having an edge with by the new radio, then determine whether there is available frequency spectrum of at least one connected set comprising at least one node with at least one edge with the new radio, wherein the available frequency spectrum of a connected set means frequency spectrum that is not used by at least one other radio comprising each node, of the connected set, with an with the new radio and not a frequency spectrum, or portion thereof, that would result in interference at a protection point, whose neighborhood encompass a geographic location of the new radio, having a level equal to or greater than an interference margin of the protection point, wherein the interference margin for a protection point is a sum of at least a head room margin for the protection point and an unused interference margin of the frequency spectrum; and determine that there is available frequency spectrum, then:

assign a new color to the new radio, wherein a new color is a color not used in a connected set having a node with an edge with the new radio or a color not used in the network graph; and assign at least a portion of a contiguous portion of the available frequency spectrum to the new color;

determine that there is no available frequency spectrum, then:

determine a node of the connected set having an edge with the new radio and with which the new radio interferes the least;

assign the frequency spectrum, or a portion thereof, allocated to the color of the determined node to the new radio; and determine a transmit power of the new radio by reducing the transmit power to eliminate the edge between the new radio and the determined node;

determine whether interference from the new radio at a protection point associated with the frequency spectrum assigned to the new radio and allocated to the new color assigned to the new radio is greater than the interference margin of the protection point, wherein the neighborhood of the protection point encompasses the geographic location of the new radio; and determine that the interference from the new radio at the protection point associated with the frequency spectrum is greater than the interference margin of the protection point, then reduce the transmit power of the new radio so that interference at the protection point is not greater than any interference margin of the protection point.

33. The system of claim 23, wherein the processing circuitry is further configured to:

determine if a pre-existing node of the network graph comprises the new radio; and determine that a pre-existing node comprises the new radio, then:

identify each edge created between a pair of nodes consisting of the pre-existing node and another node of the network graph;

determine whether there is at least one identified edge;

determine that there are no edges identified, then determine a frequency spectrum and a maximum transmit power for the new radio;

determine that at least one edge is identified, then determine, for each identified edge, whether both nodes, of at least one pair of nodes, are allocated a same frequency spectrum or a portion thereof; and for each identified edge, determine that both nodes of the pair of nodes are not allocated the same frequency spectrum or a portion thereof, then determine a frequency spectrum and a maximum transmit power for the new radio.

* * * * *